US012044996B2

(12) United States Patent
Hayashi et al.

(10) Patent No.: US 12,044,996 B2
(45) Date of Patent: Jul. 23, 2024

(54) PRINTING APPARATUS TO OPERATE IN A CONTRACT MODE WITH CONSUMABLE ITEM TO BE USED IN PRINTING AND EXECUTE PROFIT RETURNING PROCESS ACCORDING TO CONTENT OF THE CONTRACT

(71) Applicant: BROTHER KOGYO KABUSHIKI KAISHA, Nagoya (JP)

(72) Inventors: Masahiro Hayashi, Anjo (JP); Naoya Okazaki, Hashima (JP); Satoru Oki, Nagoya (JP); Sadaaki Miyazaki, Nagoya (JP); Tetsunori Mori, Kariya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/325,266

(22) Filed: May 30, 2023

(65) Prior Publication Data

US 2023/0384727 A1 Nov. 30, 2023

(30) Foreign Application Priority Data

May 30, 2022 (JP) ................. 2022-088005

(51) Int. Cl.
*G03G 15/00* (2006.01)
*B41J 2/175* (2006.01)
(Continued)

(52) U.S. Cl.
CPC ...... *G03G 15/5075* (2013.01); *B41J 2/17546* (2013.01); *B41J 29/393* (2013.01);
(Continued)

(58) Field of Classification Search
None
See application file for complete search history.

(56) References Cited

U.S. PATENT DOCUMENTS

2008/0288416 A1* 11/2008 Arnott .................... G06Q 40/12
711/E12.001
2020/0094568 A1* 3/2020 Koganehira ......... B41J 2/17503
(Continued)

FOREIGN PATENT DOCUMENTS

JP 2021-160229 A 10/2021
JP 2022-006784 A 1/2022
(Continued)

OTHER PUBLICATIONS

U.S. Appl. No. 18/325,274, filed May 30, 2023.
Extended European Search Report dated Nov. 3, 2023 from EP 23 17 5821.0.

*Primary Examiner* — Haris Sabah
(74) *Attorney, Agent, or Firm* — Scully, Scott, Murphy & Presser, PC

(57) ABSTRACT

There is provided a printing apparatus including: an installing part in which a consumable item to be used in printing is to be installed; a printer configured to print an image on a printing medium by using the consumable item installed in the installing part; and a controller. The printing apparatus is configured to operate in a contract mode based on content of a contract regarding the consumable item to be used in the printing. The controller is configured to execute a profit returning process of performing profit return according to the content of the contract in a case that the consumable item installed in the installing part has a type corresponding to a non-contract mode not based on the content of the contract and that the printing apparatus is operated in the contract mode.

19 Claims, 15 Drawing Sheets

(51) Int. Cl.
  *B41J 29/393* (2006.01)
  *G03G 15/08* (2006.01)
  *G06F 3/12* (2006.01)
  *G06Q 30/02* (2023.01)
  *G03G 21/18* (2006.01)

(52) U.S. Cl.
  CPC ....... *G03G 15/0863* (2013.01); *G06F 3/1203* (2013.01); *G06F 3/1229* (2013.01); *G06F 3/1285* (2013.01); *G06Q 30/0278* (2013.01); *G03G 15/553* (2013.01); *G03G 15/556* (2013.01); *G03G 21/1803* (2013.01); *G03G 21/1889* (2013.01)

(56) References Cited

U.S. PATENT DOCUMENTS

| | | | |
|---|---|---|---|
| 2021/0096793 A1 | 4/2021 | Fukusada | |
| 2021/0232086 A1* | 7/2021 | Kyotani | G03G 21/1878 |
| 2021/0232089 A1* | 7/2021 | Kyotani | G03G 21/1882 |
| 2021/0252869 A1* | 8/2021 | Kishimoto | B41J 2/17523 |
| 2021/0302872 A1* | 9/2021 | Suzuki | G03G 15/553 |
| 2021/0306516 A1 | 9/2021 | Yamada | |
| 2021/0402777 A1 | 12/2021 | Hayashi et al. | |
| 2022/0100440 A1* | 3/2022 | Yamada | G06F 3/1259 |
| 2023/0382121 A1* | 11/2023 | Hayashi | G06F 3/1229 |

FOREIGN PATENT DOCUMENTS

| | | |
|---|---|---|
| JP | 2022-7723 A | 1/2022 |
| JP | 2022-56970 A | 4/2022 |

* cited by examiner

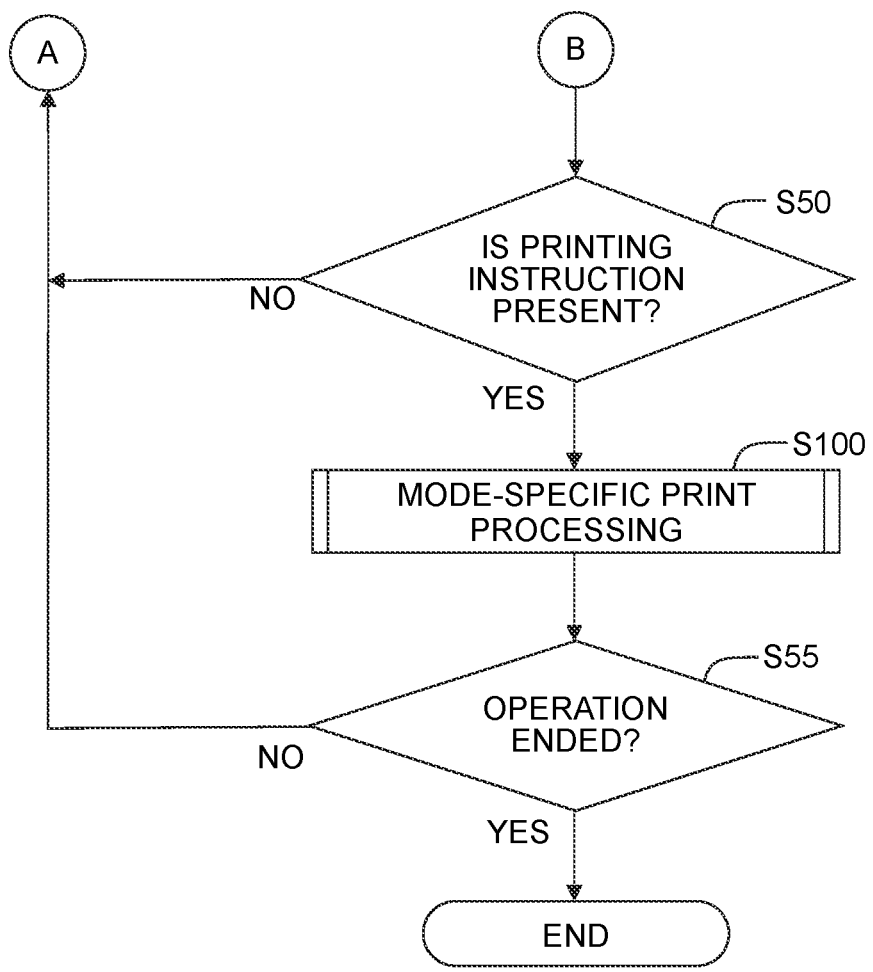

PRINTING APPARATUS TO OPERATE IN A CONTRACT MODE WITH CONSUMABLE ITEM TO BE USED IN PRINTING AND EXECUTE PROFIT RETURNING PROCESS ACCORDING TO CONTENT OF THE CONTRACT

REFERENCE TO RELATED APPLICATIONS

This application claims priority from Japanese Patent Application No. 2022-088005 filed on May 30, 2022. The entire content of the priority application is incorporated herein by reference.

BACKGROUND ART

There is a conventional technique wherein a subscription contract is concluded between a user and a printing service provider and a user is permitted to perform printing within an upper limit value of a printing amount within a predetermined period of time, only at a fixed-sum payment (fixed-rate payment) on the side of the user. This conventional technique discloses both of an aspect of the subscription business as described above and an aspect of a retail business in which the user purchases a commercially available consumable item (product) by himself or herself and installs and uses the purchased consumable item in the printing apparatus.

DESCRIPTION

In the above-described conventional technique, after the subscription contract has been concluded, a specific consumable item corresponding to the subscription contract (hereinafter referred to as a "contract consumable item", as appropriate), which is different from the commercially available consumable item used in the above-described aspect of retail business, is used. This contract consumable item is provided at the expense of the printing service provider, and is not a billing object to the user who possesses the printing apparatus.

Here, such a case is assumed that the user initially purchases a printing apparatus by herself/himself and installs, in the printing apparatus, a consumable item packed together with the printing apparatus and/or any commercially available consumable item so as to perform printing (hereinafter referred to as a "retail use" as appropriate), and then the user newly concludes a subscription contract with the printing service provider. In this case, for example, during a period of time until the contract consumable item dispatched from a predetermined delivery source is delivered to (arrives at) the user, the printing operation at the fixed-sum payment by using the contract consumable item is not performed and an ordinary printing operation using the commercially available consumable item is consequently performed.

Further, for example, there might be such a case that a plurality of consumable items is delivered based on the subscription contract, that even after one consumable item has arrived, the printing operation at the fixed-sum payment using the plurality of contract consumable items is not performed until the remaining other consumable item(s) arrive(s) and the plurality of consumable items becomes to be complete, and that the ordinary printing operation using the commercially available consumable item is performed.

Furthermore, there might be also such a case for example that although the contract consumable item is installed based on the subscription contract and the printing at the above-described fixed-sum payment is performed, the contract consumable item is consumed earlier than expected, and the user has no choice but to install a commercially available consumable item so as to perform the printing and/or that the location of the user is not suitable for an effective delivery of the contract consumable item, and installment of a commercially available consumable item so as to perform the printing is rather suitable, as well.

In each of the above-described cases, it is disadvantageous for the user since the ordinary printing using the commercially available product for which the user bears the purchase cost is performed even though a printing service contract such as the subscription with which any monetary burden or expense regarding the consumable item does not occur as described above has been already concluded. Further, in a case that a new contract consumable item which has been delivered arrives and the commercially available consumable item is detached and replaced by the contract consumable item, the detached commercially available consumable item is not used thereafter, which in turn gives rise to such a disadvantage for the user that the cost borne by the user for the purchase therefor is wasted.

An object of the present disclosure is to provide a printing apparatus and a printing apparatus with a consumable item each of which is capable of suppressing any disadvantage to the user which might occur in spite of the printing service contract such as the subscription, etc., is concluded According to an aspect of the present disclosure, there is provided a printing apparatus including: an installing part (mounting unit) in which a consumable item to be used in printing is to be installed (mounted); a printer configured to print an image on a printing medium by using the consumable item installed in the installing part; and a controller. The printing apparatus is configured to operate in a contract mode based on content of a contract regarding the consumable item to be used in the printing. The controller is configured to execute a profit returning process of performing profit return according to the content of the contract in a case that the consumable item installed in the installing part has a type corresponding to a non-contract mode not based on the content of the contract and that the printing apparatus is operated in the contract mode.

The printing apparatus of the present disclosure is operable in the contract mode. The contract mode corresponds to the content of the contract concluded with the contract source regarding the consumable item to be used in the printing, and is an operational mode which corresponds, for example, to a subscription contract and in which a printing within an upper limit value of a printing amount within a predetermined period of time is possible, only at a fixed-sum payment by the user. A non-contract mode corresponds to a retail use and is an operational mode in a case that the user uses a commercially available consumable item, which the user has purchased by herself or himself, by installing the purchased commercially available consumable item in the installing part (the mounting unit, the installment part, the acceptor) of the printing apparatus.

The consumable item installable in the installing part includes a consumable item of a first type corresponding to the contract mode and a consumable item of a second type corresponding to the non-contract mode. Originally, in a case that the printing apparatus is operated in the contract mode, the printing apparatus is in a state that the consumable item of the first type is installed, and in a case that the printing apparatus is operated in the non-contract mode, the printing apparatus is in a state that the consumable item of the second type is installed.

The present disclosure deals with such a case that the consumable item of the second type is installed even though the printing apparatus is operating in the contract mode, for any reason; in such a case, the profit returning process is performed by the controller. According to the present disclosure, the double monetary burden to the user is lowered by, for example, executing the profit return, thereby making it possible to suppress any disadvantage to the user which might occur in spite of a state that the contract has been concluded.

According to another aspect of the present disclosure, there is provided a printing apparatus with a consumable item including: a consumable item to be used in printing; an installing part in which the consumable item is installed or to be installed; a printer configured to print an image on a printing medium by using the consumable item installed in the installing part; and a controller. The printing apparatus with a consumable item is configured to operate in a contract mode based on content of a contract regarding the consumable item to be used in the printing. The consumable item has a first type corresponding to the contract mode or a second type corresponding to a non-contract mode not based on the content of the contract. The controller is configured to execute a profit returning process of performing profit return according to the content of the contract in a case that the consumable item installed in the installing part has the second type and that the printing apparatus is operated in the contract mode.

According to the present disclosure, it is possible to suppress any disadvantage to the user which might occur in spite of the printing service contract such as the subscription, etc., is concluded FIG. 1 is a functional block diagram depicting the schematic configuration of the entirety of a print processing system.

FIGS. 6A and 6B are flow charts depicting a control procedure in a multifunction peripheral.

First Embodiment

Figure 1:
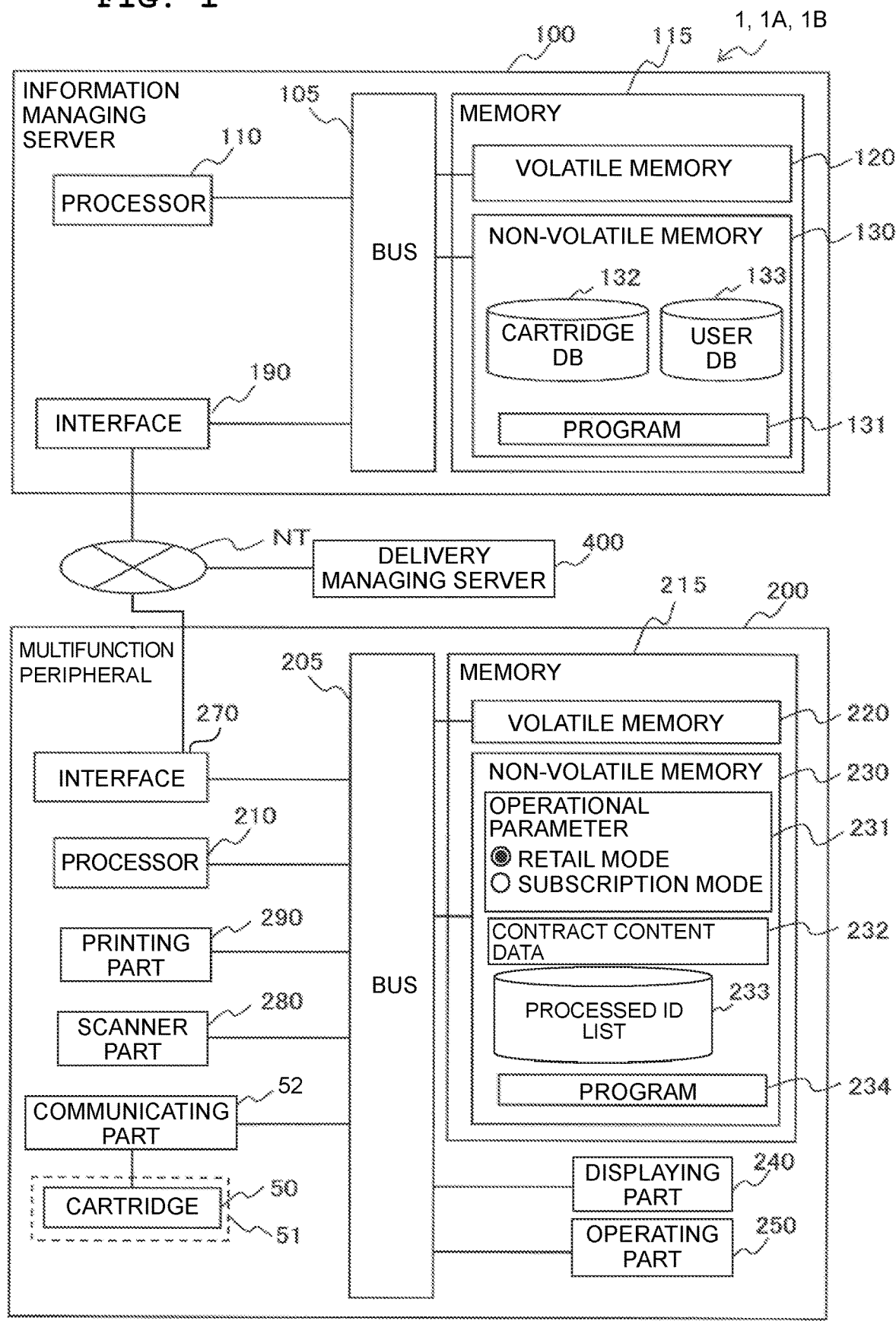

A print processing system according to a first embodiment of the present disclosure is depicted in FIG. 1. The present embodiment is an embodiment of a print processing system 1 operable based on a subscription contract concluded between a user and a printing service provider, as an example of a printing service contract. Under the subscription contract, the user is permitted (allowed) to perform printing within an upper limit value of a printing amount within a predetermined period of time, only at a fixed-sum payment of the user. Further, in the present embodiment, an explanation will be given about a case that the subscription contract is implemented (comes into effect) at a timing at which an ink cartridge (CTG) dedicated to the subscription (to be described later on) is actually installed in a multifunction peripheral.

<Outline of Print Processing System>

In FIG. 1, the print processing system 1 includes an information managing server 100, a multifunction peripheral 200 and a delivery (distribution) managing server 400. The information managing server 100, the multifunction peripheral 200 and the delivery managing server 400 are connected to a network NT, and are capable of communicating with one another. Note that the multifunction peripheral 200 is an example of a "printing apparatus".

<Information Managing Server>

The information managing server 100 is, for example, a server provided and controlled or managed by a manufacturer of the multifunction peripheral 200 and has a processor 110, a memory 115 and an interface 190. The processor 110, the memory 115 and the interface 190 are connected to one another via a bus 105.

The memory 115 is provided with a volatile memory 120 and a non-volatile memory 130. The volatile memory 120 is, for example, a DRAM and temporarily stores a variety of kinds of data. The non-volatile memory 130 is, for example, a hard disk drive or a solid state drive, and has a program storage area 131, a cartridge database (cartridge DB) 132, a user database (user DB) 133 and a data storage area (not specifically depicted in the drawings).

The processor 110 is a device which performs data processing and is, for example, a CPU. The processor 110 executes a program stored in the program storage area 131 to thereby execute a variety of kinds of processing including data communication with respect to the multifunction peripheral 200 and the delivery managing server 400 which are connected to the network NT.

The interface 190 is a wired LAN interface or wireless interface configured to communicate with another device(s) and is connected to the network NT.

<Delivery Managing Server>

The delivery managing server 400 is installed, for example, in a company which performs delivery services for a variety of kinds of goods or items, and has a processor, a memory and an interface configured to perform connection with respect to the network NT (which are not depicted in the drawings).

<Multifunction Peripheral>

The multifunction peripheral 200 is owned, for example, by a company (business company) which provides the above-described printing service. Note that the multifunction peripheral 200 may also be privately owned by the user who uses the multifunction peripheral 200. The multifunction peripheral 200 has an interface 270, a processor 210, a printing part (printer) 290, a scanner part 280, a communicating part 52, a cartridge holder 51, a memory 215, a displaying part 240 and an operating part 250. The interface 270, the processor 210, the printing part (an example of a printer) 290, the scanner part 280, the communicating part 52, the memory 215, the displaying part 240 and the operating part 250 are connected to one another via a bus 205.

The memory 215 includes a volatile memory 220 and a non-volatile memory 230. The volatile memory 220 is, for example, a DRAM and temporarily stores a variety of kinds of data. The non-volatile memory 230 is, for example, a flash memory. The non-volatile memory 230 has an operational parameter storage area 231, a contract content data storage area 232, a processed ID list storage area 233, and a program storage area 234. A variety of kinds of programs is stored in the program storage area 234; these various programs include a processing program associated with execution of a flowchart in each of FIGS. 6A, 6B, 7A, and 7B etc., which will be descried later on. The processing program is stored in advance in the program storage area 234 as, for example, a firmware. Each of an operational parameter stored in the operational parameter storage area 231, a contract content data stored in the contract content data storage area 232, and a processed ID list stored in the processed ID list storage area 233 will be described later on.

The processor 210 is a device which performs a variety kind of processing and is, for example, a CPU. Note that the processor 210 is an example of a "controller". The processor 210 executes the above-described processing program stored in the program storage area 234.

The displaying part 240 is, for example, a liquid crystal display. The operating part 250 is a device which receives an operation by the user. The user is capable of inputting a variety of kinds of instructions to the multifunction peripheral 200 by operating the operating part 250. The interface 270 is a wired or wireless network interface configured to perform communication with another device(s) and is connected to the network NT. Note that the interface 270 is an example of a "communication interface".

The scanner part 280 uses a photoelectric conversion element such as a CCD, a CMOS, etc., so as to optically read an original (manuscript, document) as an object of reading, thereby generating scan data representing the image which has been read.

The printing part 290 takes a sheet (paper sheet, paper) from a sheet feeding tray and conveys the sheet by a conveying mechanism which is not depicted in the drawings, while printing an image, by a predetermined system, on the paper which is being conveyed. In the following, an explanation will be given about a case, as an example, in which the printing is performed by the ink-jet system. Namely, the printing part 290 performs image formation with respect to the paper by using an ink of an ink cartridge 50 which is detachably installed in the cartridge holder 51. Note that specifically regarding the details of the ink cartridge 50, the ink cartridge 50 includes ink cartridges 50, respectively, of an yellow ink (Y), a magenta ink (M), a cyan ink (C) and a black ink (K); in the following explanation, however, for the sake of convenience, the ink cartridges 50 of, respectively, the yellow ink (Y), the magenta ink (M), the cyan ink (C) and the black ink (K) will be referred simply to as the "ink cartridge(s) 50", without distinguishing therebetween, unless otherwise specified. Note that the multifunction peripheral 200 in a state of being provided with the ink cartridge(s) 50 is an example of a "printing apparatus with a consumable item".

The communicating part 52 is, for example, a terminal, etc., which is electrically connected to a cartridge memory (to be described later on) possessed by the ink cartridge 50 installed in the cartridge holder 51 so as to perform reading and writing with respect to a content recorded on the cartridge memory.

<Operational Mode and Type of Ink Cartridge>

The print processing system 1 of the present embodiment is configured to be applicable (compatible) not only to a retail operational mode which has been commonly used as an operational mode thereof, but also to a subscription operational mode based on the subscription contract concluded between the user and the printing service provider as described above.

Here, the term "retail operational mode" is an operational mode in which the user performs printing by replenishing the multifunction peripheral 200 with a commercially available consumable item which the user individually purchases with cost at a store, etc. In contrast, the term "subscription operational mode" is an operational mode in which the user can use a specific contract consumable item as much as the user wants with a fixed-sum, provided that the printing amount does not exceed the predetermined number of printing in a predetermined period of time. In the subscription operational mode, in a case that the specific contract consumable item becomes short or used up, a replenishment of the specific contract consumable item is provided at the expense of the printing service provider and is not charged to the user. The specific contract consumable item to be covered by the subscription contract includes, for example, paper, ink, a waste liquid tank configured to store a used ink, an ink head configured to jet (discharge) an ink onto the sheet during the printing, and a cutter configured to cut the sheet, etc. In an example of the present embodiment, an explanation will be given about a case wherein a subscription contract is concluded, specifically with an ink cartridge 50 filled with an ink being as the contract consumable item. In this case, the ink cartridge 50 is an example of a "consumable item (consumable article, consumption article)", the cartridge holder 51 is an example of a "installing part", the sheet is an example of a "printing medium", the subscription mode is an example of a "contract mode", the retail mode is an example of a "non-contract mode", the ink is an example of a "printing agent", an amount of the remaining ink (ink remaining amount) is an example of a "consumption state amount" representing a "remaining amount" or a "consumption amount", and a subscription contract is an example of a "fixed-sum contract".

Although the product line-up of the multifunction peripheral 200 includes an apparatus exclusive for the retail mode, an apparatus exclusive for the subscription mode, and a hybrid apparatus of which operational mode can be switchable between the retail mode and the subscription mode, an explanation will be given about a case of using the hybrid apparatus in the example of the present embodiment. At a time of initially introducing a hybrid multifunction peripheral 200, the hybrid multifunction peripheral 200 is set, as a default state, to be the retail operational state in which the operational parameter is set to be the retail mode, and retail cartridges (to be described later on) are installed, respectively, in cartridge holders 51 for the respective four colors. Further, for example, the user operates the operating part 250 of the multifunction peripheral 200, at an arbitrary timing after the operation of the hybrid multifunctional peripheral 200 under the retail operational mode has been started, so as to perform a procedure of concluding the subscription contract with respect to the information managing server 100 via the network NT, thereby making it possible to perform switching from the retail operational mode to the subscription operating mode. In this situation, a specific contract content of the contract such as a period of time during which the subscription contract is in effect and/or an upper limit value of the number of printing sheet, etc., is stored in the contract content data storage area 232.

Figure 2A:
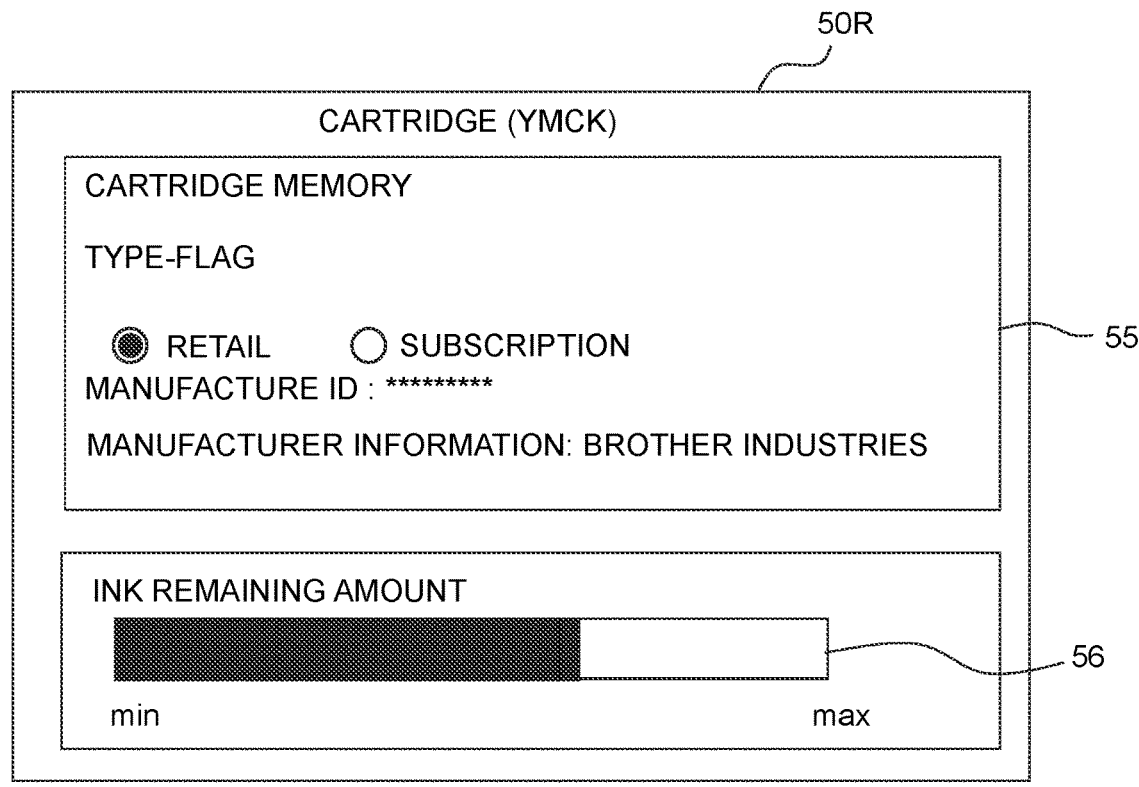
FIGS. 2A and 2B are functional block diagrams depicting, respectively, the schematic configuration of a retail cartridge and the schematic configuration of a subscription cartridge.
Figure 2B:
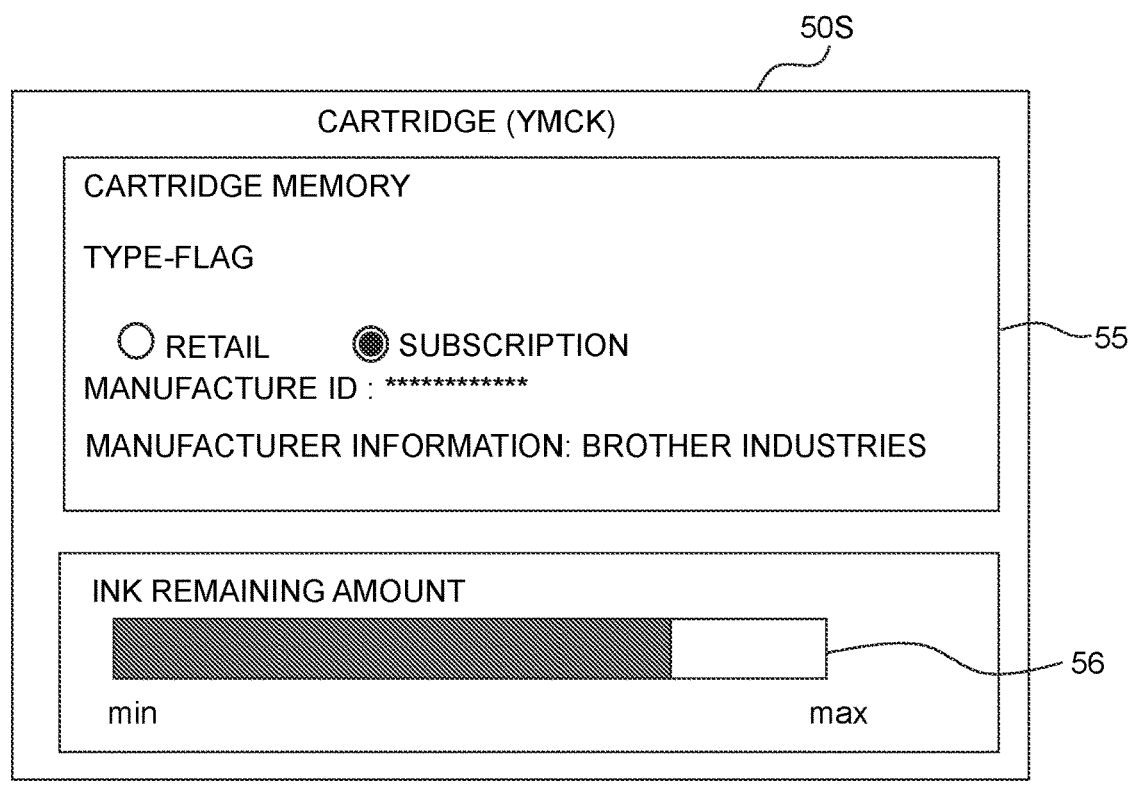

Further, with respect to the ink cartridges 50, basically, ink cartridges 50R and ink cartridges 50S which are of mutually different types (kinds) are used, respectively, at a time of the retail operation and at a time of the subscription operation in a switching manner. FIG. 2A depicts the schematic configuration of a retail cartridge 50R exclusive for the retail mode, and FIG. 2B depicts the schematic configuration of a subscription cartridge 50S exclusive for the subscription mode. These retail and subscription cartridges 50R and 50S are both common for the respective four colors of YMCK and are same as each other in view of the mechanical configuration (hardware configuration) of the cartridges themselves. Meanwhile, inks filled in the retail cartridges 50R and inks filled in the subscription cartridges 50S may have chemical compositions different from each other to some extent.

Each of the ink cartridges 50R, 50S is provided with a cartridge memory 55 and an ink tank 56. The cartridge memory 55 is, for example, a flash memory, and is configured such that a variety of kinds of data is readable from and writable to the cartridge memory 55 via the above-described communicating part 52 of the multifunction peripheral 200. A type-flag, a manufacture ID, manufacturer information ("BROTHER INDUSTRIES." in the example depicted in the drawing), and a variety of other kinds of information are recorded (stored) in the cartridge memory 55 of the ink cartridge 50R or 50S at the time of manufacturing in the factory. The type-flag indicates whether the type of the ink cartridge 50R or 50S is "retail" or "subscription". The manufacture ID identifies an individual (manufactured individual) of the ink cartridge 50R or 50S. The ink tank 56 is filled with an ink having a chemical composition corresponding to the type and the color of each of the ink cartridges 50R and 50S, with the ink remaining amount thereof being managed (controlled) by the multifunction peripheral 200. The multifunction peripheral 200, as an example, manages (controls) the ink remaining amount by counting an accumulated ink usage amount dot by dot since a time that each of the ink cartridges 50S was a new product. Note that in the drawings, the ink in the retail cartridge 50R is depicted in black (solid) and the ink in the subscription cartridge 50S is depicted in shading so that the inks in the retail and subscription cartridges 50R and 50R, respectively, are easily distinguished visually. In a case that the printing is performed in the multifunction peripheral 200, different printing controls are used corresponding to the ink compositions which are different with respect to the types of the cartridges. Note that the cartridge memory 55 is an example of a "consumable item memory", the respective pieces of the information such as the type-flag, the manufacture ID and the manufacturer information recorded in the cartridge memory 55 is an example of "consumable item information", the subscription type of the type-flag is an example of a "first type", the retail type of the type-flag is an example of a "second type", and the information of the type-flag is an example of "first type information" and "second type information".

<Problem Occurring at a Time of Conclusion of Subscription Contract Due to Difference in Aspects of Distribution Between Different Types of Cartridges>

Figure 3:
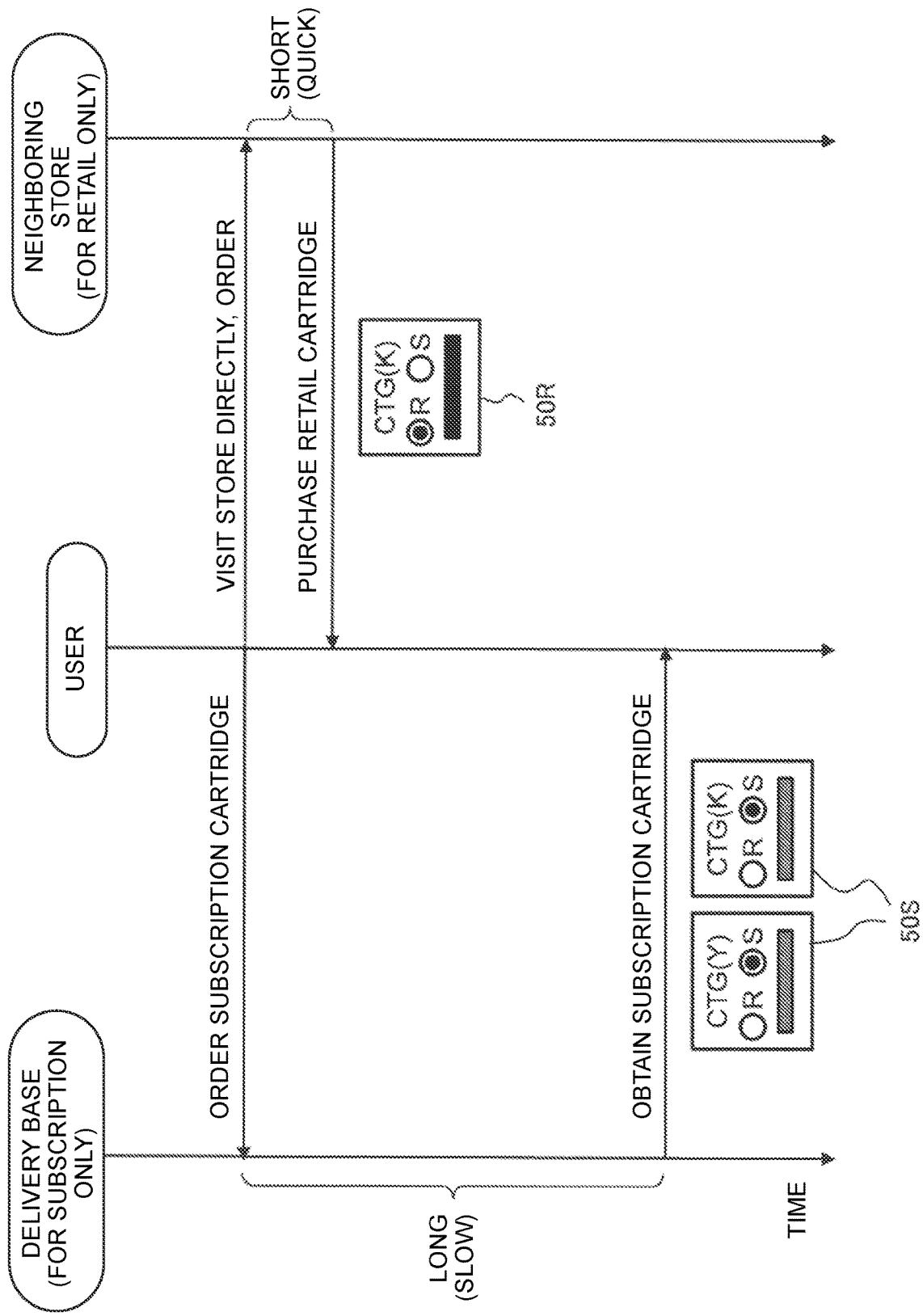
FIG. 3 is a view for explaining the difference between aspects of distribution of the retail cartridge and the subscription cartridge.

The retail cartridge 50R and the subscription cartridge 50S are greatly different from each other in terms of an aspect of distribution thereof to the user. For example, as depicted in FIG. 3, in a case of the retail cartridge 50R, a large number of the retail cartridges 50R are prepared as a stock in advance at neighboring stores such as consumer electronics stores, etc., of which number is large across the country. Thus, a user is capable of immediately obtaining one or more of the retail cartridge(s) 50R by visiting the store in person or by placing an order, for example, by mail or via online. In contrast, the arrangement of delivery of the subscription cartridge 50S is made with respect to a delivery base (dispatch base) from the information management server 100 via the delivery management server 400. The number of the delivery base is smaller than that of the consumer electronics store; further, for the reason regarding the cost of delivery (shipping), the cartridge is transported together with another delivery item in a part of the routes, which in turn leads to a considerable amount of time required for the delivery. As a result, it takes a long period of time to obtain the subscription cartridge 50S, as compared with the retail cartridge 50R.

Figure 4:
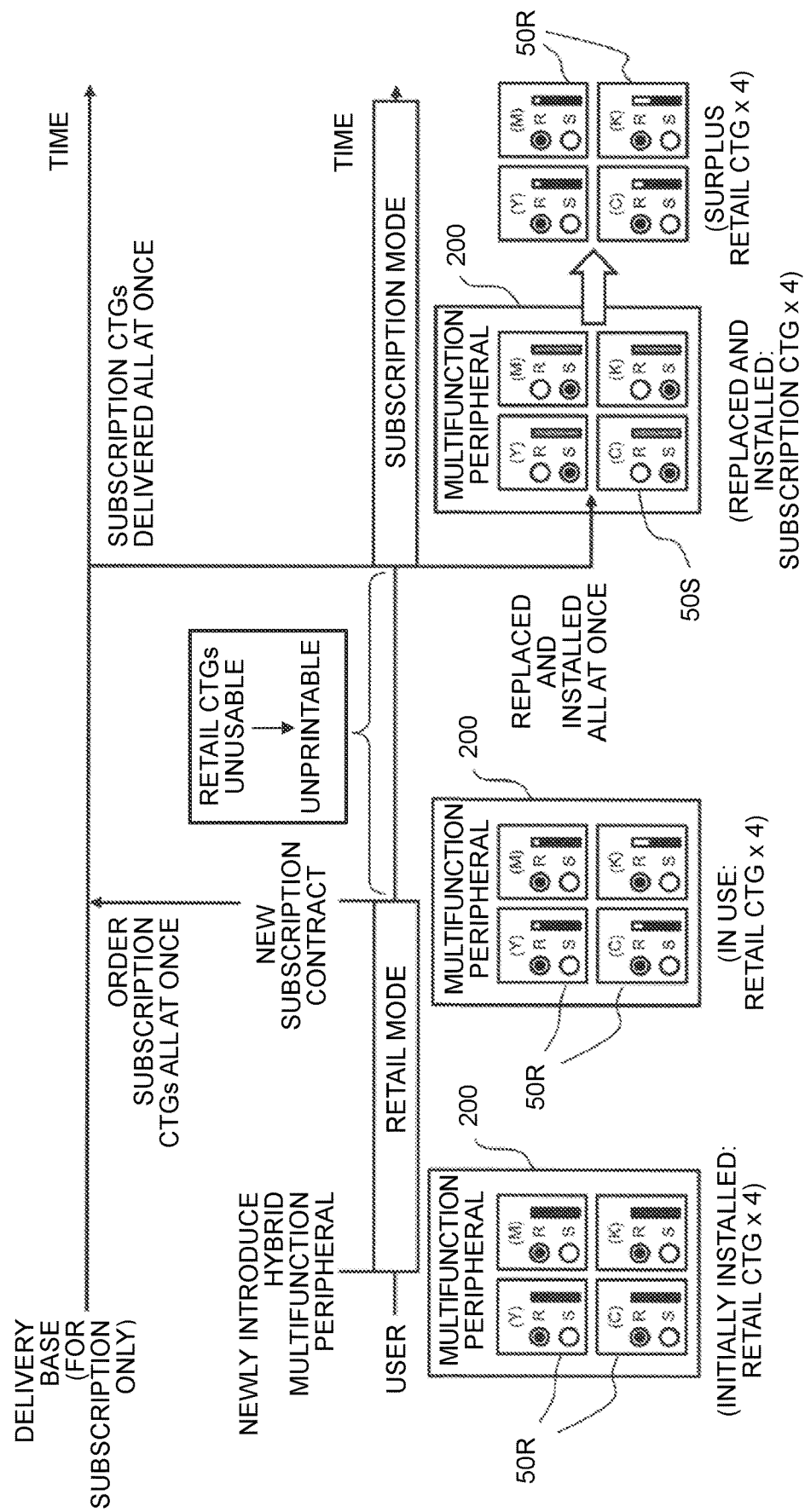
FIG. 4 is a view for explaining a comparative example wherein a non-printable period occurs at a time of conclusion of a subscription contract.

For the reason indicated above, in a case that the subscription contract is newly concluded while the hybrid multifunction peripheral 200 is being operated in the retail mode, there occurs a period of time, during which the printing cannot be performed (unprintable period) in this hybrid multifunction peripheral 200, as in a comparative example depicted in FIG. 4. Namely, in a case that the hybrid multifunction peripheral 200 is newly introduced, the retail cartridges 50R of the four YMCK colors are installed as a default, and the hybrid multifunction peripheral 200 is operated in the retail mode initially. In this situation, the type of the ink cartridges 50 installed in the hybrid multifunction peripheral 200 and the type of the operational mode at this point of time are both the same retail mode which are coincident, and thus the printing operation is enabled or possible in the hybrid multifunction peripheral 200. Further, during the operation in the retail mode, even in a case that any one of the retail cartridges 50R of the respective colors is consumed and the ink remaining amount thereof becomes to be short, the user is capable of purchasing a new retail cartridge 50R at the neighboring store, and of continuing the printing.

In a case, however, that the user newly concludes a subscription contract during the operation in the retail mode, although the subscription cartridges 50S of all the YMCK colors are ordered all at once, the printing cannot be performed during a delivery period of time since the order of the subscription cartridges 50S and until the arrival and installment of the subscription cartridges 50S in the hybrid multifunction peripheral 200. This is because, by switching the operational parameter of the hybrid multifunction peripheral 200 to the subscription mode at the time of conclusion of the subscription contract, the retail cartridges 50R being installed at this point time become to be non-usable. Further, it is not until the ordered subscription cartridges 50S of all the colors arrive and are installed in the hybrid multifunction peripheral 200 all at once that the subscription mode is firstly started and a count up of the number of printing is started; and thus a subscription operating fee corresponding to the period of time of the delivery (unprintable period of time) until then is wasted, which in turn generates disadvantage for the user. Further, the retail cartridges 50R which are replaced by the subscription cartridges 50S while being partly used are not to be used thereafter, which in turn generates disadvantage for the user to the extent of the remaining ink amount(s) which become(s) to be excess or surplus.

<Regarding Method of Switching Operational Mode of Present Embodiment>

Figure 5:
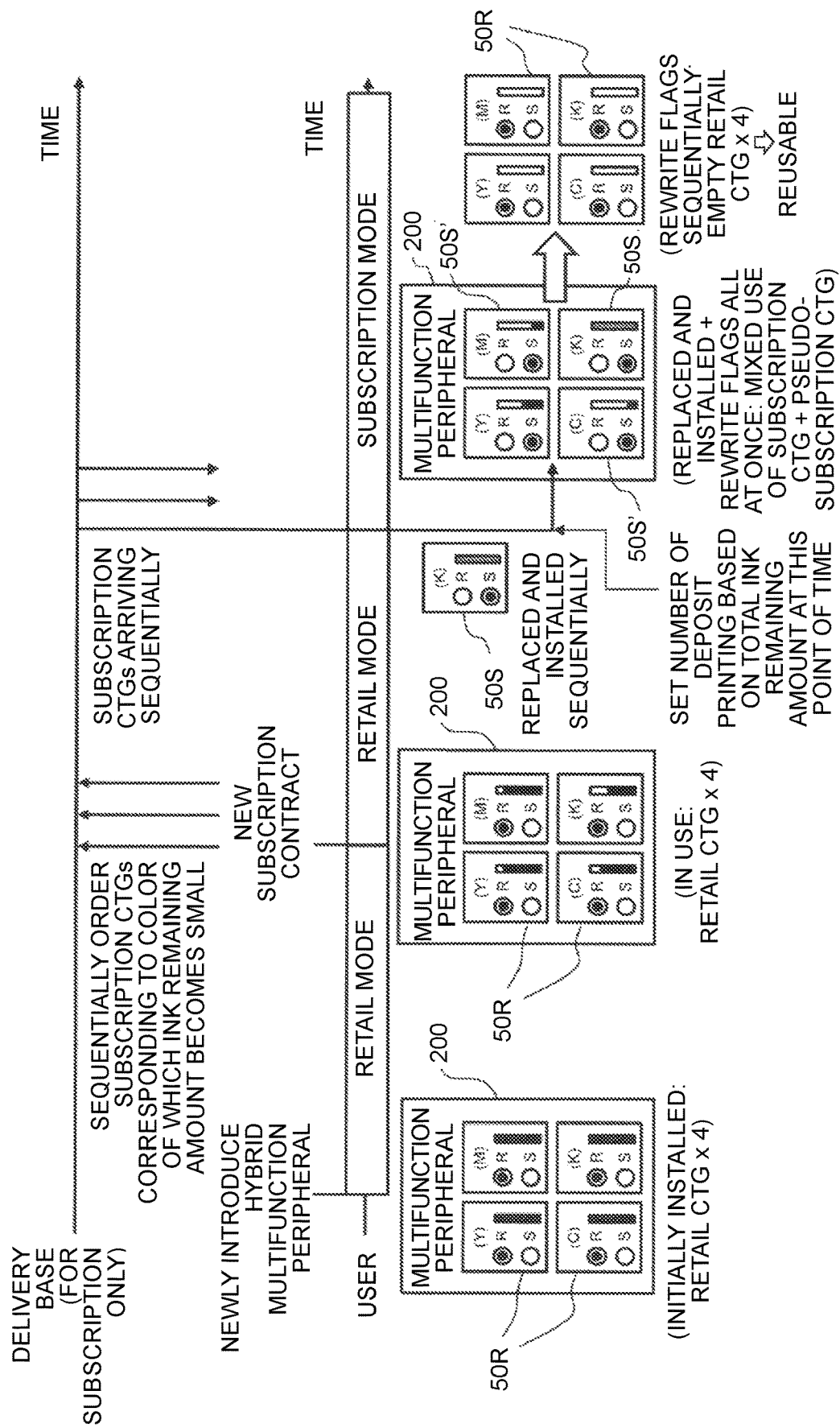
FIG. 5 is a view for explaining a method of switching operational modes.

In view of this, in the present embodiment, even in the case that the subscription contract is newly concluded during the operation in the retail mode, the operation in the retail mode is to be continued by using the retail cartridge(s) 50R, and a subscription cartridge 50S of a color of which ink remaining amount is determined to be small to some extent is automatically ordered (thus, subscription cartridges 50S are ordered sequentially), as depicted in FIG. 5. This ordering timing is preferably such a timing that a subscription cartridge 50S of a certain color can arrive at the user, in view of the delivery period of time, before the ink remaining amount of a retail cartridge 50R of the certain color, in the multifunction peripheral 200, indicates shortage. With this, regarding each of the color, the subscription cartridge 50S can be installed replacing the retail cartridge 50R before the retail cartridge 50R becomes completely short or empty of ink. Namely, even in a case that a predetermined shelf life period from the manufacturing until the actual use (installment) is set to the subscription cartridge 50S, it is possible to install the subscription cartridge 50S within the shelf life period.

In the present embodiment, in a case that the first subscription cartridge 50S arrives at the user and is installed in the multifunction peripheral 200 replacing the retail cartridge 50R, the operational parameter of the multifunction peripheral 200 is switched from the retail mode to the subscription mode for the first time, and the type-flags of all of the ink cartridges 50 being installed in the multifunction peripheral 200 at the timing are rewritten to the subscription type all at once. That is, in a case that the first subscription cartridge 50S is installed in the multifunction peripheral 200 replacing the retail cartridge 50R, the operation under the subscription mode is made possible by using remaining three retail cartridges 50R as pseudo-subscription cartridge 50S' together with the first subscription cartridge 50S.

The rewriting of the type-flag of the ink cartridge 50 is performed provided that the manufacturer information recorded in the cartridge memory 55 of the ink cartridge 50 is obtained, and the ink cartridge 50 is confirmed to be a genuine product of the manufacturer being a precondition for providing a subscription service. Then, after the type-flag is rewritten and the operation under the subscription mode is started, the timing at which the operation under the subscription mode is started is set to be an origin of a cycle of the subscription contract. Note that such condition (that is, the ink cartridge being the genuine product) is an example of "a predetermined condition".

In the example of the present embodiment, regarding all of the retail cartridge 50R, the ink remaining amount is detected, and the number of deposit printing set based on the ink remaining amount is recorded in the contract content data, when the operation under the subscription mode is started for the first time. The number of deposit printing is, for example, the number of printing additionally available for the user with no cost, after the printing as much as the upper limit number of printing is performed by the user in the contract period of time set by the subscription contract. That is, since the ink remaining amounts of all of the pseudo-subscription cartridges 50S' (formerly, the retail cartridges 50R) at the timing of starting of the operation under the subscription mode can be regarded as monetary burden of the user, profit can be returned to the user by the printing processing system 1 configured to impart (grant) the number of deposit printing equivalent to such ink remaining amounts. Here, the number of deposit printing is imparted based on the fact that the ink remained in the retail cartridge 50R is consumed in the printing under the subscription mode. Thus, the printing processing system 1 may control the number of deposit printing such that the number of deposit printing gradually increases each time the printing under the subscription mode is performed. Alternatively, in a case that the pseudo-subscription cartridge 50S' (formerly, the retail cartridge 50R) is replaced with the subscription cartridge 50S in a state that the ink still remains in the pseudo-subscription cartridge 50S', the printing processing system 1 may reduce the number of deposit printing as much as the number depending on the ink amount remaining in the replaced pseudo-subscription cartridge 50S'. Note that the number of deposit printing is an example of "predetermined permitted amount".

Regarding all of retail cartridges 50R (pseudo-subscription cartridge 50S'), the type-flag is rewritten such that the type-flag is returned to the "retail", right before the retail cartridge is replaced with the subscription cartridge 50S. Such rewriting is performed, for example, when it is detected that the ink remaining amount of the retail cartridge 50R is empty. By doing so, all of the retail cartridges 50R after the replacement are empty with no ink remaining, and the type-flags thereof are each correctly written as "retail". Thus, appropriate reusing or recycling depending on the type can be performed. Here, the type-flag of the pseudo-subscription cartridge 50S' may be maintained to be "retail" even if the multifunction peripheral operates under the subscription mode. In such a case, the multifunction peripheral 200 stores the manufacture ID of a certain cartridge to be used as the pseudo-subscription cartridge 50S' in the non-volatile memory 230 of the multifunction peripheral 200. Thus, it is possible to use the certain cartridge as the pseudo-subscription cartridge 50S' continuously, even after the power of the multifunction peripheral 200 is switched off, and then switched on. Further, regarding all of retail cartridges 50R (pseudo-subscription cartridge 50S'), the type-flag may be rewritten such that the type-flag is returned to the "retail", when the subscription contract is cancelled.

<Controlling Procedure>

Figure 6A:
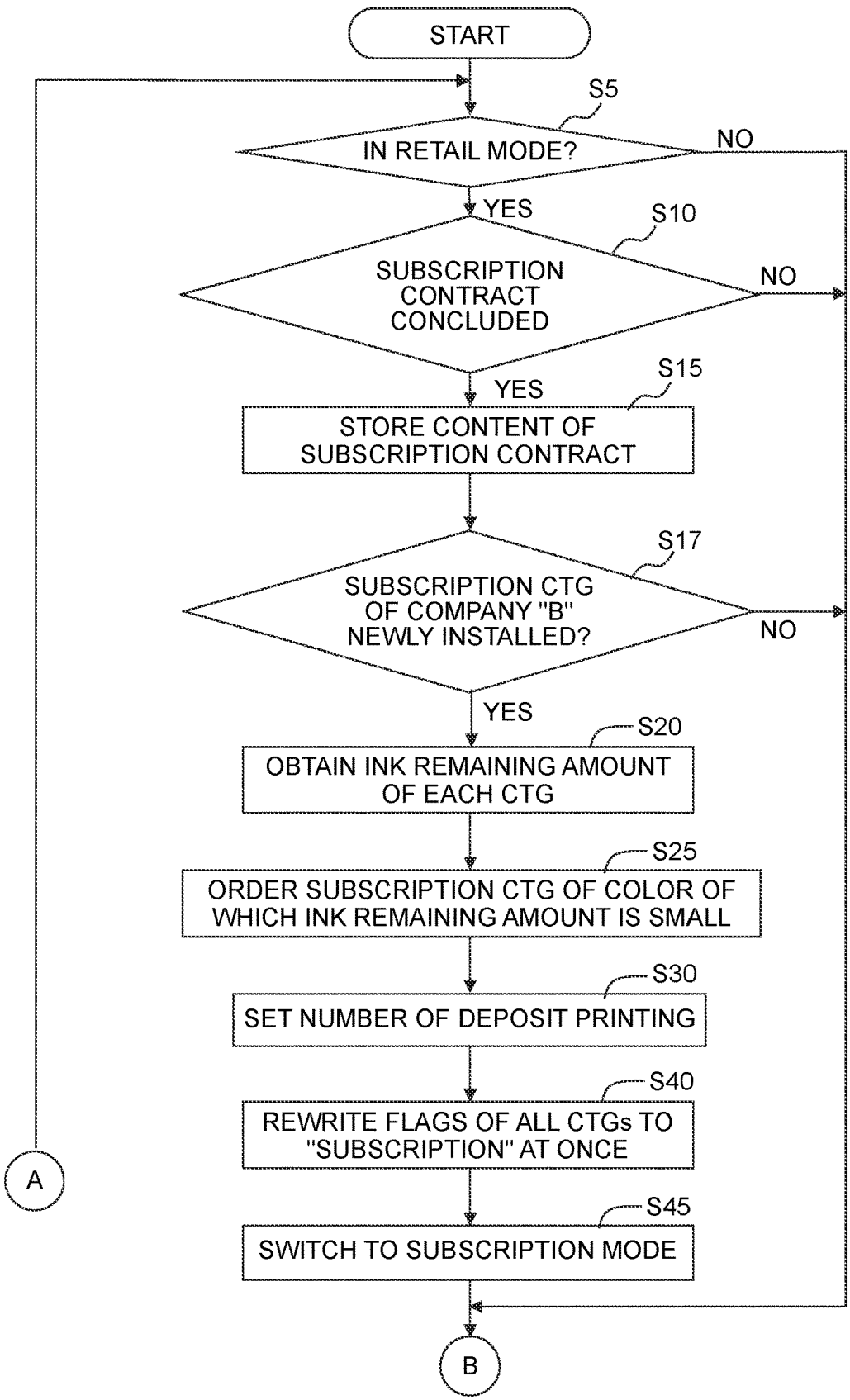

In order to realize the above-described method in the present embodiment, an example of a controlling procedure executed by the processor 210 of the multifunction peripheral 200 will be explained by flowcharts of FIGS. 6A, 6B, 7A and 7B. First, in a case that a main power source is switched ON in the multifunction peripheral 200, a procedure to be described as follows, as depicted in FIGS. 6A and 6B, is started. Note that as described above, at the time that the hybrid multifunction peripheral 200 is initially introduced, the retail cartridges of the all colors, each of which is in a state of being fully charged (filled), are installed, respectively, in the cartridge holders 51 of the all colors; further, the operational parameter is set to be retail mode as a default mode.

First, in step S5, the operational parameter is referred to so as to determine whether or not the multifunction peripheral 200 is in the retail mode. In a case that the multifunction peripheral 200 is in the subscription mode, a NO determination is made, and the procedure proceeds to step S50. On the other hand, in a case that the multifunction peripheral 200 is in the retail mode, a YES determination is made, and the procedure proceeds to step S10.

In step S10, it is determined as to whether or not the user has concluded the procedure of the subscription contract using the multifunction peripheral 200. As an example, this determination is made in a case that the multifunction peripheral 200 receives, from the information managing server 100, a notification that the procedure of the subscription contract has been newly concluded. In a case that the procedure of the subscription contract has not been newly concluded, a NO determination is made and the procedure proceeds to step S50. On the other hand, in a case that the procedure of the subscription contract has been newly concluded, a YES determination is made and the procedure proceeds to step S15.

In step S15, the multifunction peripheral 200 obtains contract content data indicating a specific contract content, for example, such as: length of cycle period, amount of fixed-sum and the like of the operation in the subscription mode, from the information managing server 100 and records the obtained contract content data in the contract content data storage area 232. Note that the contract content data storage area 232 is an example of a "memory".

Next, in step S17, it is determined as to whether or not the subscription cartridge(s) 50S is (are) newly installed in the cartridge holder(s) 51. Note that in this situation, manufacturer information is also obtained from each of the ink cartridges 50 which are being installed, and it is also determined as to whether or not the content of the manufacturer information is the same manufacturer (in the drawing, abbreviated as "COMPANY B") as that of the multifunction peripheral 200, in other words, as to whether or not the ink cartridge(s) 50 is a genuine product of the manufacture of the multifunction peripheral 200, as well. In a case that the subscription cartage(s) 50S is (are) not newly installed in the cartridge holder(s) 51, or that at least one of the ink cartridges 51 being installed is not a genuine product of the manufacturer, a NO determination is made and the procedure proceeds to step S50. On the other hand, in a case that the subscription cartage(s) 50S is (are) newly installed in the cartridge holder(s) 51 and that all the ink cartridges 51 being installed are each a genuine product of the manufacturer, a YES determination is made and the procedure proceeds to step S20.

In step S20, an ink remaining amount of each of the ink cartridges 50 of all the colors which are being installed in the cartridge holders 51 at this point of time is obtained; next, in step S25, delivery of a subscription cartridge 50S of which color is same as a color, of all the colors, which is detected to be the smallest in step S20 is arranged. Then, in step S30, the number of deposit printing is set based on the ink remaining amount of each of the colors detected as described above, and is recorded as the contract content data.

In step S40, the type-flags of the respective ink cartridges 50 of all the colors being installed in the cartridge holders 51 at this point of time are rewritten to the subscription flags all at once, regardless of the original types of all the cartridges 50; next in step S45, the operational parameter of the multifunction peripheral 200 is also switched to the subscription mode. With this, the operation in the subscription mode is started from this point of time.

Next, in step S50, it is determined as to whether or not a printing instruction is received from the user via, for example, the operation on the operating part 250. In a case that the printing instruction is not received, a NO determination is made, and the procedure returns to the procedure of step S5. On the other hand, in a case that the printing instruction is received, a YES determination is made, and mode-specific print processing (print processes depending on different modes) of step S100 is executed. Afterward, in step S55, it is determined as to whether or not an operation of instructing to end the procedure (operation) is made by the user. In a case that there is no instruction to end the procedure, a NO determination is made and the procedure returns to the procedure of step S5; on the other hand, in a case that there is the instruction to end the procedure, a YES determination is made and this flow is ended.

Figure 7A:
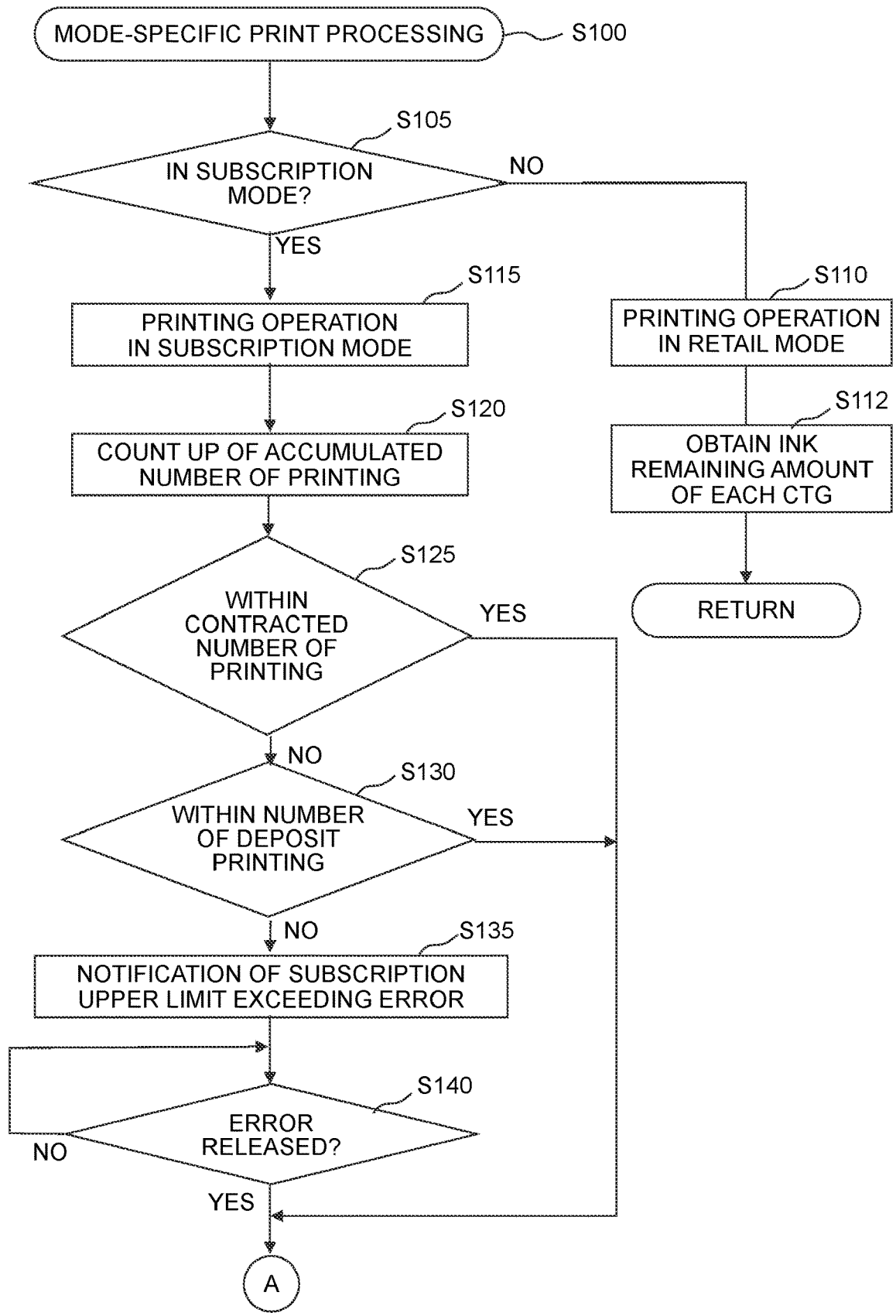
FIGS. 7A and 7B are flow charts depicting a procedure of mode-specific print process.
Figure 7B:
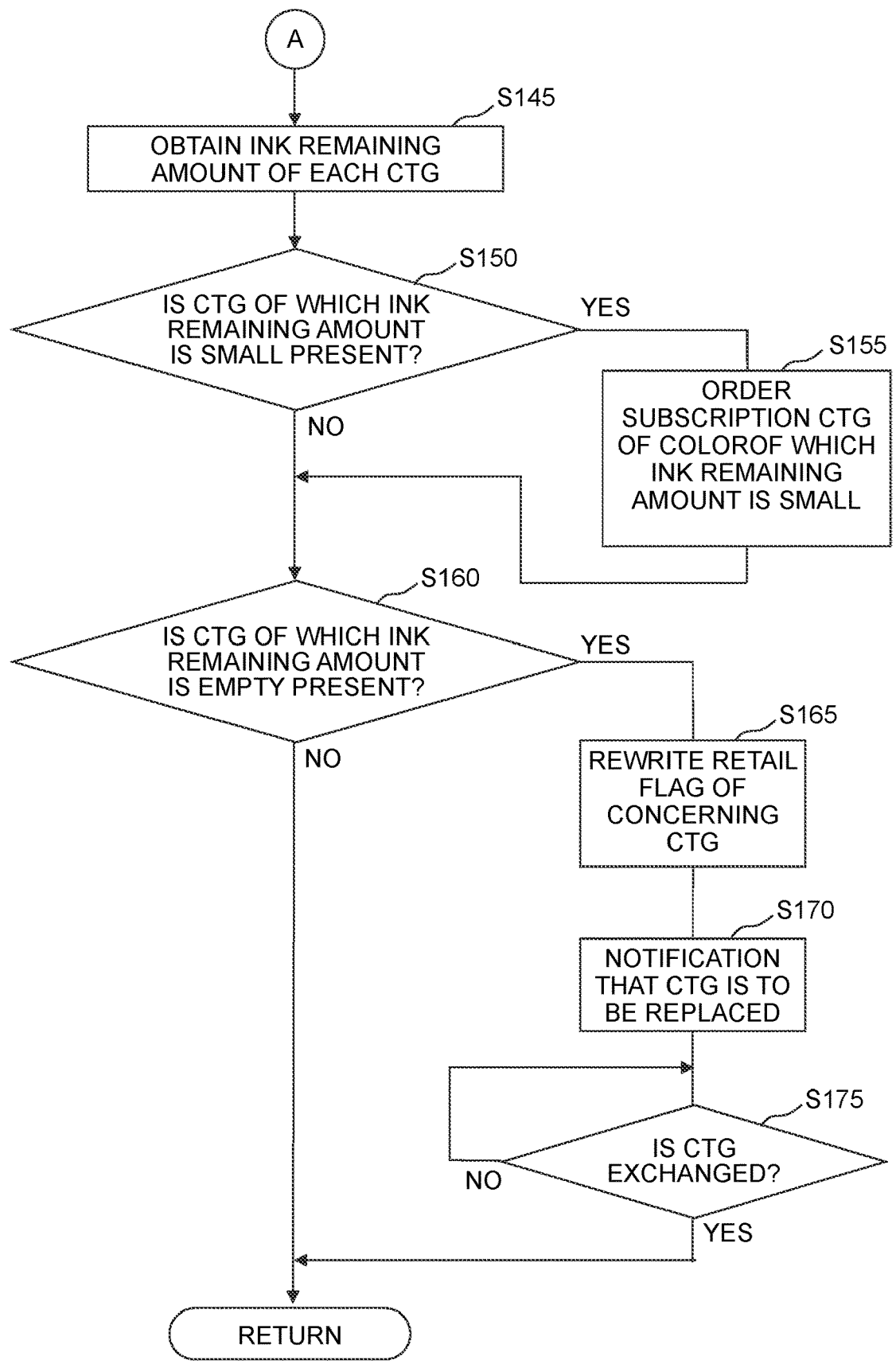

FIGS. 7A and 7B indicate the control procedure in the mode-specific print processing S100 executed by the processor 210 of the multifunction peripheral 200. First, in step S105, the operational parameter is referred to so as to determine whether or not the multifunction peripheral 200 is in the subscription mode. In a case that the multifunction peripheral 200 is in the retail mode, a NO determination is made and the procedure proceeds to step S110; afterwards, the printing operation in the retail mode is executed and then obtainment of the ink remaining amount of each of the retail cartridges 50R is performed in step S112, and the processing is ended. On the other hand, in a case that the multifunction peripheral 200 is in the subscription mode, a YES determination is made and the procedure proceeds to step S115.

In step S115, the printing operation in the subscription mode is executed, and then the procedure proceeds to step S120, and a count up of the accumulated number of printing, during the period of the subscription contract at this point of time is performed. Next, in step S125, it is determined as to whether or not the accumulated number of printing which has been counted up is within the contracted number of printing of the subscription contract; in a case that the accumulated number of printing which has been counted up is within the contracted number of printing, an YES determination is made and the procedure proceeds to step S145. On the other hand, in a case that the accumulated number of printing which has been counted up exceeds the contracted number of printing, an NO determination is made, and next in step S130, a further determination is made as to whether or not the exceeding number of printing exceeding the contract number of printing is within the number of deposit printing which is previously set. In a case that the exceeding number of printing is within the number of deposit printing, a YES determination is made, and the procedure proceeds to step S145. On the other hand, in case that the exceeding number of printing exceeds the number of deposit printing, a NO determination is made, and the procedure proceeds to step S135. Note that the accumulated number of printing which has been counted up is an example of a "printing amount", the contracted number of printing is an example of an "upper limit value", and the number of deposit printing is an example of "predetermined permitted amount".

In step S135, a notification is displayed on the displaying part 240 so as to notify the following fact to the user. That is, the accumulated number of printing in the contracted period is in a state of an upper limit exceeding error in which the accumulated number of printing exceeds the contracted number of printing and the number of deposit printing of the subscription contract, and thus an additional payment is required. Next, in step S140, the procedure stands by in a loop manner until the upper limit exceeding error is released by, for example, newly completion, by the user, of a responding procedure of the subscription contract, etc.; in a case that the loop is released, the procedure proceeds to step S145. In step S145, the ink remaining amount of each of the cartridges 50 is obtained. Here, the ink remaining amount of each of the subscription cartridges 50S or the above-described pseudo-subscription cartridge(s) 50S' is obtained.

In step S150, it is determined as to whether or not there is an ink cartridge 50 of which ink remaining amount is small at this point of time. The determination is made using the following ink remaining amount as a referential ink remaining amount. That is, the ink remaining amount based on which it is expected that ink shortage may occur, in view of the pace of ink consumption so far, at the timing after the delivery period for delivering the ink from the delivery base to the user has passed. A "NO determination" is made in a case that the ink remaining amount of each of the ink cartridges 50 is greater than the referential ink remaining amount, and the procedure proceeds to step S160. On the other hand, a "YES determination" is made in a case that the ink remaining amount of at least one ink cartridge 50, of the ink cartridges 50, is smaller than the referential ink remaining amount, and in step S155, an ink cartridge 50 corresponding to the ink cartridge 50 of which ink remaining amount is smaller than the referential ink remaining amount is ordered, and then the procedure proceeds to step S160. Note that in a case that there is another ink cartridge 50 of which ink remaining amount is near (similar) to the referential ink remaining amount, the another ink cartridge 50 may be ordered as well, in order to improve the efficiency of delivery.

In step S160, it is determined as to whether or not there is an ink cartridge 50 of which ink remaining amount is substantially short or empty, at this point of time. In a case that each of the cartridges 50 has an ink remaining amount to some extent, a NO determination is made and the flow is ended. On the other hand, in a case that at least one ink cartridge 50, of the ink cartridges 50, is in a state of shortage of ink remaining amount, a YES determination is made and the procedure proceeds to step S165.

In step S165, the type-flag of the ink cartridge 50 of which ink remaining amount is short is rewritten to the retail flag; next in step S170, a notification that this ink cartridge 150 is required to be replaced is displayed on the displaying part 240 so as to notify the user. Next, in step S175, the processing stands by in a loop manner until the user installs a new subscription cartridge 50S replacing the ink cartridge 50 which is required to be replaced; in a case that the loop is released, this flow is ended.

Note that the procedure of step S17 is an example of a "consumable item information obtaining process" and a "type identifying process", the procedures of steps S40 and S45 are an example of a "treating process", and the procedure of step S30 is an example of a "profit returning process".

<Effect of the Embodiment>

As described above, in the present embodiment, the multi-function peripheral 200 (the print processing system 1) is operable in the two operational mode which are the subscription mode and the retail mode. The subscription mode corresponds to the content of the contract concluded with the service provider regarding the ink cartridges 50 used for the printing, and is, for example, the operational mode which permits the user to perform the printing within the upper limit value of the printing amount within the predetermined period of time, only at the fixed-sum payment of the user, corresponding to the subscription contract. The retail mode corresponds to the retail use and is the operational mode in which the user uses the commercially available ink cartridges 50 purchased by herself or himself, by installing the purchased commercially available ink cartridges 50 in the cartridge holders 51 of the hybrid multi-function peripheral 200.

The ink cartridge 50 installable in the cartridge holder 51 includes the type of the subscription cartridge 50S corresponding to the subscription mode and the type of the retail cartridge 50R corresponding to the retail mode. Originally, in a case that the multifunction peripheral 200 is operated in the subscription mode, the multifunction peripheral 200 is in a state that the subscription cartridges 50S are installed therein, whereas in a case that the multifunction peripheral 200 is operated in the retail mode, the multifunction peripheral 200 is in a state that the retail cartridges 50R are installed therein.

The present embodiment corresponds to such a case that the retail cartridge(s) 50R is (are) installed in the multifunction peripheral 200 even though the multifunction peripheral 200 is operating in the subscription mode, for any reason; in such a case, the procedure of step S30 is performed by the processor 210. According to the present embodiment, it is possible to lower the double monetary burden to the user by executing the profit return, thereby making it possible to suppress any disadvantage to the user which might occur in spite of a state that the contract has been concluded.

Further, in the present embodiment, in particular, the processor 210 provided on the multifunction peripheral 200 executes the procedures of steps S17, S40 and S45 so as to determine as to in which operational mode the multifunction peripheral 200 is to be operated. In the procedure of step S17, the obtainment of the content stored in the cartridge memory 55 regarding the ink cartridge 50 being installed in the cartridge holder 51 of the multifunction peripheral 200 is performed, for example, via the communication with the communicating part 52. In accordance with the result of the obtainment of the information stored in the cartridge memory 55, the procedure of step S17 as described above is performed, and it is identified whether the ink cartridge 50 being installed in the cartridge holder 51 is of the subscription type or of the retail type.

In a case that the ink cartridge 50 is identified as being of the retail type, then under the condition that the information stored in the cartridge memory 55 satisfies the predetermined condition, the ink cartridge 50 of the retail type is treated (handled) as being of the subscription type via the procedures, respectively, of steps S40 and S45 at the time of starting the operation in the subscription mode. The predetermined condition is considered to be such a condition, for example, that in the information stored in the cartridge memory 55 which is obtained, the ink cartridge 50 is indicated as being of a genuine product by an authorized manufacturer, etc. In a case that the predetermined condition is satisfied, the ink cartridge 50 being installed in the cartridge holder 51 is treated, via the procedures of steps S40 and 45 as described above, as being of the subscription type corresponding to the content of the concluded subscription contract, even in a case that the ink cartridge 50 is of the retail type corresponding to the retail use.

In the present embodiment, even in a case that the ink cartridge 50 of the retail type corresponding to the retail use is being installed in the cartridge holder 51, the ink cartridge 50 is treated as being of the subscription type at the time of starting the operation in the subscription mode provided that the information stored in the cartridge memory 55 of the ink cartridge 50 satisfies the predetermined condition, and the multifunction peripheral 200 operates in the subscription model. For example, in a case that a plurality of ink cartridges 50 of the subscription type is shipped or delivered based on the subscription contract, such a situation may occur that one ink cartridge 50 has been delivered but the remaining ink cartridges 50 have not been delivered, and thus some of the plurality of ink cartridges 50 of the subscription type is not at hand. Even in such a situation, it is possible to perform the printing operation at the fixed-sum payment described above.

According to the present embodiment, it is possible to suppress any disadvantage on the side of the user in a case that the subscription contract is newly concluded in the state that the multifunction peripheral 200 is being used in the retail mode.

Further, as described above, since the ink cartridge 50 of the retail type is purchased by the user himself or herself with respect to the retail use, the user already has borne the burden of the purchase cost in the past. At the time of concluding the subscription contract, for example, the user also bears the fixed-sum payment corresponding to a predetermined period of time of the subscription contract, thereby leading to the double monetary burden to the user.

In the present embodiment, in the procedure of step S30 as described above, the profit return corresponding to the content of the concluded subscription contract is performed based on the changing of the type from the retail type to the subscription type via the procedures of steps S40 and S45. According to the present embodiment, by the execution of the profit return, it is possible to reduce the double monetary burden to the user. Note that the form of the profit return to the user is not limited to or restricted by the addition of the number of deposit printing as described above. For example, the profit return may be performed, based on the ink remaining amount of all of the retail cartridges 50R at a point of time when the subscription mode is started first, by setting and applying a free-of-charge period corresponding to the ink remaining amount of all of the retail cartridges 50R so as to stop the count up of the accumulated number of printing only during the free-of-charge period or by simply deducting a sum corresponding to the ink remaining amount from a next monthly charge, etc.

Note that in the example of the present embodiment, although the explanation has been made regarding the case that the multifunction peripheral 200 is of the ink-jet system and that the ink cartridge 50 is applied as the consumable item; other than this, for example, in a case that the multifunction peripheral 200 is of a laser system, toners of respective CYMK colors are applied each as a retail consumable item or as a subscription consumable item.

Further, in the present embodiment, in particular, at a timing at which an ink cartridge 50S of the subscription type which is delivered after the subscription contract has been concluded and is installed in the cartridge holder 51, the ink cartridges 50R of the retail type being installed in the cartridge holder 51 and different from the delivered ink cartridge 50S are treated as being of the subscription type, thereby making it possible to start the printing operation in the subscription mode.

Moreover, in the present embodiment, in particular, in the procedure of step S17 executed by the processor S210, the information stored in the cartridge memory 55 of the ink cartridge 50 is obtained; and in the procedure of step S17, information of the subscription type (subscription type information) or information of the retail type (retail type information) included in the information stored in the cartridge memory 55 is identified. In a case that the retail type is identified, via the procedures of steps S40 and S45, the retail type information included in the information stored in the cartridge memory 55 is rewritten to the subscription type information.

According to the present embodiment, in a case that an ink cartridge 50R of the retail type corresponding to the retail use is being installed in the cartridge holder 51, the retail type information is rewritten to the subscription type information, thereby treating the ink cartridge as being of the subscription type and making it possible to operate the multifunction peripheral 200 in the subscription mode.

Note that the technique or method as described above is executable by the multifunction peripheral 200 not only in the case of the cooperation with the information managing server 100 by the online connection via the network NT; the multifunction peripheral 200 is also capable of executing the above-described method by itself, for example, in a case that the multifunction peripheral 200 is used off-line as in a school print service.

Further, in the present embodiment, in particular, even in a case that at least one ink cartridge 50R of the retail type is being installed at the time of starting the operation in the subscription mode, the retail type information of all of the at least one ink cartridge 50R of the retail type is rewritten to the subscription type information, thereby making it possible to treat all of the at least one ink cartridge 50R of the retail type as being of the subscription type and to start the printing operation in the subscription mode.

Furthermore, in the present embodiment, in particular, by the procedure of step S30, the profit return in accordance with the ink remaining amount of the ink cartridge(s) 50 is performed. According to the present embodiment, in a case that the type of the ink cartridge(s) is changed from the retail type to the subscription type in the procedures of steps S40 and S45, the profit return of an appropriate content according to the ink remaining amount within the ink cartridge(s) 50 at this point of time can be performed.

Moreover, in the present embodiment, in particular, the contract concluded by the user is a fixed-sum contract which defines the upper limit value of the printing amount within the predetermined period for exchange of the payment of the predetermined sum and which is a so-called subscription contract. In this subscription contract, in a case for example that the accumulated number of printing executed by the printing part 290 within the predetermined period reaches the upper limit value, an additional payment is required to the user for the printing thereafter. In the present embodiment, as an aspect of the procedure of step S30, the profit is returned by permitting the printing exceeding the upper limit value to be performed, without requiring any additional payment, at a timing at which the additional payment should be required, in a form of a so-called number of deposit printing. With this, according to the present embodiment, the user is capable of receiving the profit return since the user is capable of performing, by free of charge, a part, of the printing, for which amount the user originally is to pay.

Further, in the present embodiment, in particular, the contract content data storage area 232 is provided in order to execute the profit return by the multifunction peripheral 200 by itself without relying on the information managing server 100, etc. In the present embodiment, in a case that the user concluded the fixed-sum contract, the content of the fixed-sum contract is stored in the contract content data storage area 232. In the procedure of step S30, in accordance with the ink remaining amount(s) of the ink cartridge(s) 50 as the object of the fixed-sum contract and the content of the fixed-sum contract stored in the contract content data storage area 232 as described above, the printing exceeding the upper limit value of the contracted number of printing as described above is permitted. According to the present embodiment, the profit return in a form of permitting the printing exceeding the upper limit value of the contracted number of printing without requiring any additional payment is executable by the multifunction peripheral 200 based on the content of the concluded fixed-sum contract.

<Modification for Preventing Overlap of Profit Return>

Note that regarding the profit return by the number of deposit printing described above, etc., a variety of kinds of checking methods, as will be explained below, may be performed so that the profit is not returned in an overlapping manner.

(1) Case of Preventing the Overlap of the Profit Return by the Multifunction Peripheral Itself Verifying a Processed ID For example, although not particularly depicted in the drawings, in a case of performing the profit return based on changing of the type of the ink cartridge 50R of the retail type, it is allowable that the multifunction peripheral 200 is provided with a processed ID list storage area 233 and that the processor 210 performs a processed ID storing processing and a processing of determining whether or not the cartridge has been already processed, as follows, so as to prevent any overlap of the profit return.

In the processed ID storing processing, in the case that the change of the type is performed with respect to the ink cartridge 50 so as to change the type thereof from the retail type to the subscription type, and thereby the procedure of profit return in step S30 is performed, a manufacture ID associated with the ink cartridge 50 subjected to the change of the type is stored in the processed ID list storage area 233 as a processed ID. In the processed ID list storage area 233, every time the procedure of step S30 is performed with respect to each of the plurality of ink cartridges 50, a manufacture ID associated with each of the plurality of ink cartridges 50 is sequentially stored and accumulated, as the processed ID.

In a case that a certain ink cartridge 50 of the retail type is newly changed to the subscription type in such a state that the manufacture IDs are accumulated in the processed ID list storage area 233, the processing of determining whether or not the cartridge has been already processed is performed by determining whether or not a manufacture ID associated with the certain ink cartridge 50 matches a processed ID which has been already stored and accumulated in the processed ID list storage area 233. In this example, in a case that the manufacture ID is determined to match the processed manufacture ID in the processing of determining whether or not the cartridge has been already processed, the procedure of step S30 is not performed so as to prevent the profit return from being performed in the overlapping manner with respect to an ink cartridge 50 for which the profit return has been performed once in the past.

According to this, by attempting the prevention of overlapping regarding the profit return at the time of changing the type of the ink cartridge 50 of the retail type, it is possible to suppress the occurrence of any damage on the side of the printing service provider. Note that in the foregoing, the processed ID list storage area 233 is an example of a "memory", the processing of storing the processed ID is an example of a "storing process", the processing of determining whether or not the cartridge has been already processed is an example of a "determining process", the manufacture ID is an example of an "identifying information" and the processed ID is an example of a "processed identifying information". Further, in the processing of determining whether or not the cartridge has been already processed, the manufacture ID not matching the processed ID is an example of a "predetermined condition".

(2) Case of Preventing the Overlap of the Profit Return by the Multifunction Peripheral Cooperating with the Information Managing Server Further, the multifunction peripheral 200 may cooperate with the information managing server 100 by transmitting and receiving information between the multifunction peripheral 200 and the information managing server 100 so as to prevent any overlap in the profit return based on changing of the type of the ink cartridge 50R of the retail type, etc. In this case, although not particularly depicted in the drawings, the processer 210 of the multifunction peripheral 200 executes a cartridge storing processing and a cartridge determining processing as follows.

In the cartridge storing processing, in a case that the changing of the type is performed with respect to a certain ink cartridge 50 from the retail type into the subscription type and the profit return of the procedure of step S30 is performed, the identifying (identification) information associated with the certain ink cartridge 50 is stored in the cartridge data base 132 of the information managing server 100, as the processed identifying (identification) information. Examples of identifying information may be identifying information of the ink cartridge 50 itself, such as the manufacture ID of the ink cartridge 50, identifying information of the cartridge memory 55 provided on the ink cartridge 50, etc. Every time the procedure of the profit return of step S30 as described above is performed with respect to one of the plurality of cartridges 50, the manufacture ID corresponding to the one of the plurality of cartridges 50 is sequentially stored and accumulated in the cartridge data base 132 of the information managing server 100, as the processed identifying information.

In a case that a certain ink cartridge 50 of the retail type is newly changed into the subscription type in such a state that the processed identifying information is accumulated in the cartridge data base 132, the multifunction peripheral 200 makes an inquiry, to the information managing server 100, regarding the manufacture ID of the certain ink cartridge 50, and the cartridge determining processing is performed based on a result of the inquiry. In this cartridge determining processing, it is determined as to whether or not the manufacture ID associated with the certain ink cartridge 50 matches the processed identifying information which has been already stored and accumulated in the cartridge data base 132. In this example, in a case that the manufacture ID is determined to match the processed identifying information in the cartridge determining processing, the procedure of step S30 is not performed so as to prevent the profit return from being performed in the overlapping manner regarding an ink cartridge 50 for which the profit return has been performed once in the past.

According to this, by attempting the prevention of overlapping regarding the profit return performed at the time of changing the type of the ink cartridge 50 of the retail type, it is possible to suppress the occurrence of any damage on the side of the printing service provider. Note that in the foregoing, the cartridge data base 132 of the information managing server 100 is an example of a "memory", the cartridge storing processing is an example of a "storing process", the cartridge determining processing is an example of a "determining process", the manufacture ID of the ink cartridge 50 is an example of "processed identifying information". In the cartridge determining processing, the manufacture ID not matching the processed identification information is an example of the "predetermined condition".

Specifically, in the cartridge determining processing as described above, determination may be made as follows. That is, under a condition that a certain manufacture ID "does not match the processed identifying information" and that the certain manufacture ID "has been manufactured as a retail cartridge", the procedure of profit return of step S30 is to be executed. Even if a certain manufacture ID "does not match the processed identification information", the procedure of step S30 is not to be executed in a case that the certain manufacture ID is a manufacture ID "having been manufactured as a subscription cartridge" or a manufacture ID of which manufacturer is not traceable (a manufacture ID given by a third party without authorization). The manufacture ID being "the manufacture ID not matching the processed identification information" and being "the manufacture ID having been manufactured as the retail cartridge" is an example of the predetermined condition.

(3) Case of Returning Profit with Respect to a Recycled Cartridge Even if the Recycled Cartridge has been Already Processed Further, under the background of promoting the recycle from the viewpoint of the ecology in the recent years, there is such a case that the ink cartridge 50 of the multifunction peripheral 200 is recycled (reproduced) by reusing, and recycled ink cartridges are being sold in the market.

In this example, in view of the above-described situation, even if the identification information is determined to match the processed identifying information based on the result of the inquiry to the information managing server 100 in the cartridge determining processing, the procedure of profit return of step S30 is executed provided that the ink cartridge 50 is a recycled ink cartridge. With this, it is possible to prevent the profit return from being not executed erroneously with respect to a recycled item (article) purchased by the user.

(4) Case of Verifying the Account in Cooperation with the Information Managing Server Furthermore, the multifunction peripheral 200 may determine whether or not the above-described profit return is properly performed, based on verifying of account performed in cooperating with the information managing server 100. In this case, although not particularly depicted in the drawings, the processer 210 performs a profit return information obtaining processing as follows.

In this case, contract identifying information being identifying information of a certain fixed-sum contract is assigned or imparted at a time that a user has concluded the certain fixed-sum contract; and profit return information indicating a content of the profit return is stored in the user data base 133 of the information managing server 100, in such a form that the profit return information is associated with the contract identifying information. Examples of the contract identifying information are a contract ID imparted to the contract itself, a user ID imparted to the user as a contracting party, etc. An example of the profit return information is the number of deposit printing guaranteed as the deposit, etc. In the profit return information obtaining processing which is executed by the multifunction peripheral 200 and which is not particularly depicted in the drawings, the profit return information stored in the information managing server 100 is obtained.

In the procedure of step S30, the printing exceeding the upper limit value as described above is permitted, in accordance with the ink remaining amount of the ink cartridge 50 as the object of the profit return and the profit return information obtained in the profit returning information obtaining processing and associated with the ink cartridge 50.

According to this example, it is possible to execute, in cooperation with the information managing server 100, the profit return in the aspect of permitting the printing exceeding the upper limit value, without requiring any additional payment, based on the information in the information managing server 100 stored at the time of concluding the contract.

Second Embodiment

A print processing system 1A according to a second embodiment of the present disclosure will be explained in the following. In the second embodiment, an explanation will be given about a case wherein the subscription contract is implemented immediately at a timing at which the user concluded the procedure of the subscription contract. Note that an explanation of a configuration and a processing in the respective devices and/or parts (components) of the print processing system 1A of the second embodiment which are same as those in the print processing system 1 of the first embodiment will be omitted as appropriate.

Figure 8:
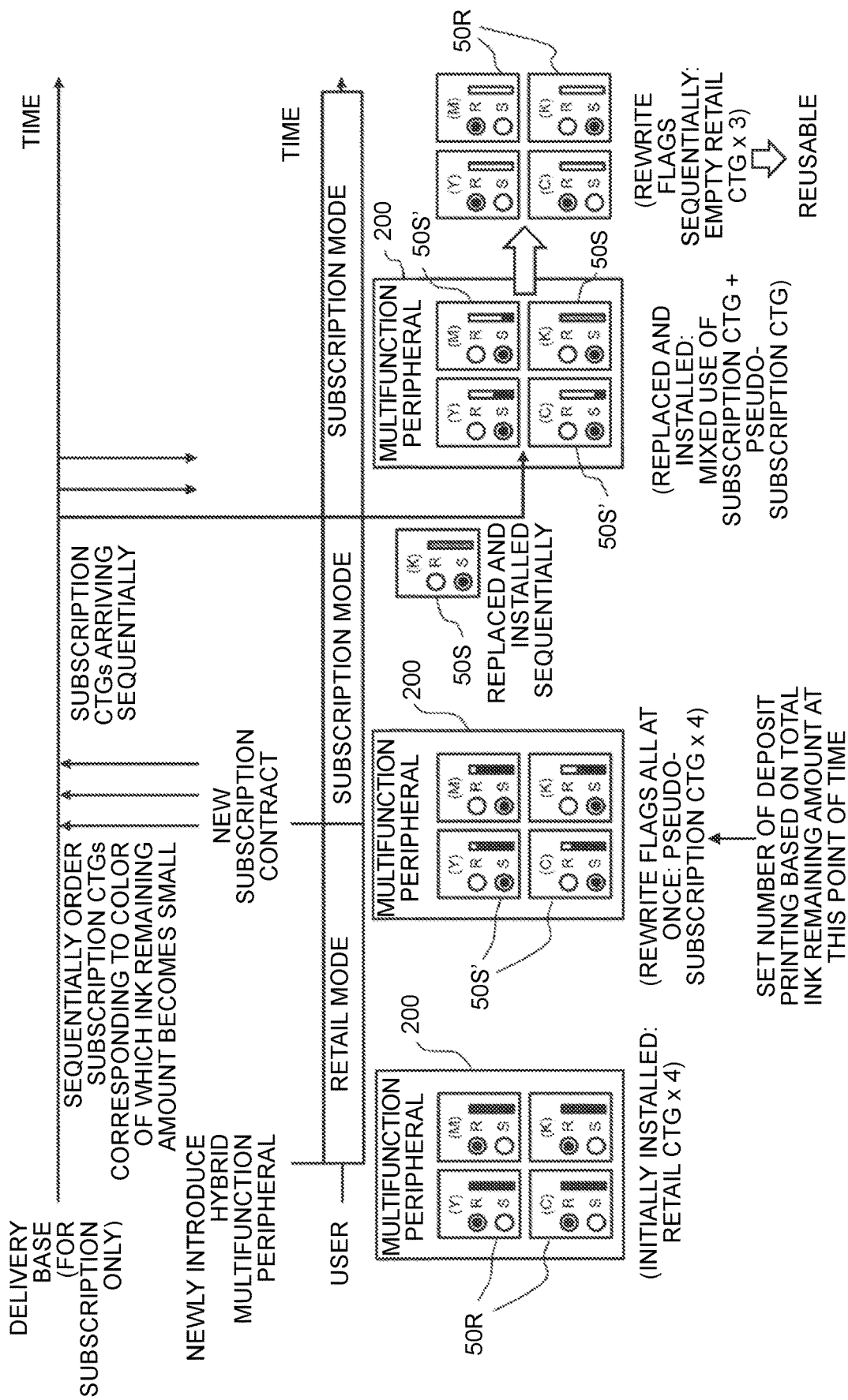
FIG. 8 is a view for explaining a method of switching operational modes.

FIG. 8 is a view for explaining a method of switching operational modes in the case of the second embodiment. The method depicted in FIG. 8 differs from the method of the first embodiment depicted in FIG. 5 in that, the type-flags of the retail cartridges 50R of all the colors being installed in the multifunction peripheral 200 are firstly rewritten to the subscription type, at a timing at which the user concluded the procedure of the subscription contract, and the operation in the subscription mode is started immediately. Accordingly, in the example of the second embodiment, the ink remaining amounts of all the ink cartridges 50 are detected at a timing at which procedure of the subscription contract is completed, and the number of deposit printing which is set based on the ink remaining amounts are recorded in the contract content data.

Also in the case of the second embodiment, regarding all the pseudo-subscription cartridges 50S' (formerly the retail cartridges 50R), the type-flag of each of all the pseudo-subscription cartridges 50S' is rewritten (returned) to the retail type right before each of all the pseudo-subscription cartridges 50S' is sequentially replaced with one of subscription cartridges which have been separately ordered and have arrived. The processing(s) and procedure(s) other than above are same as those in the first embodiment.

Figure 9A:
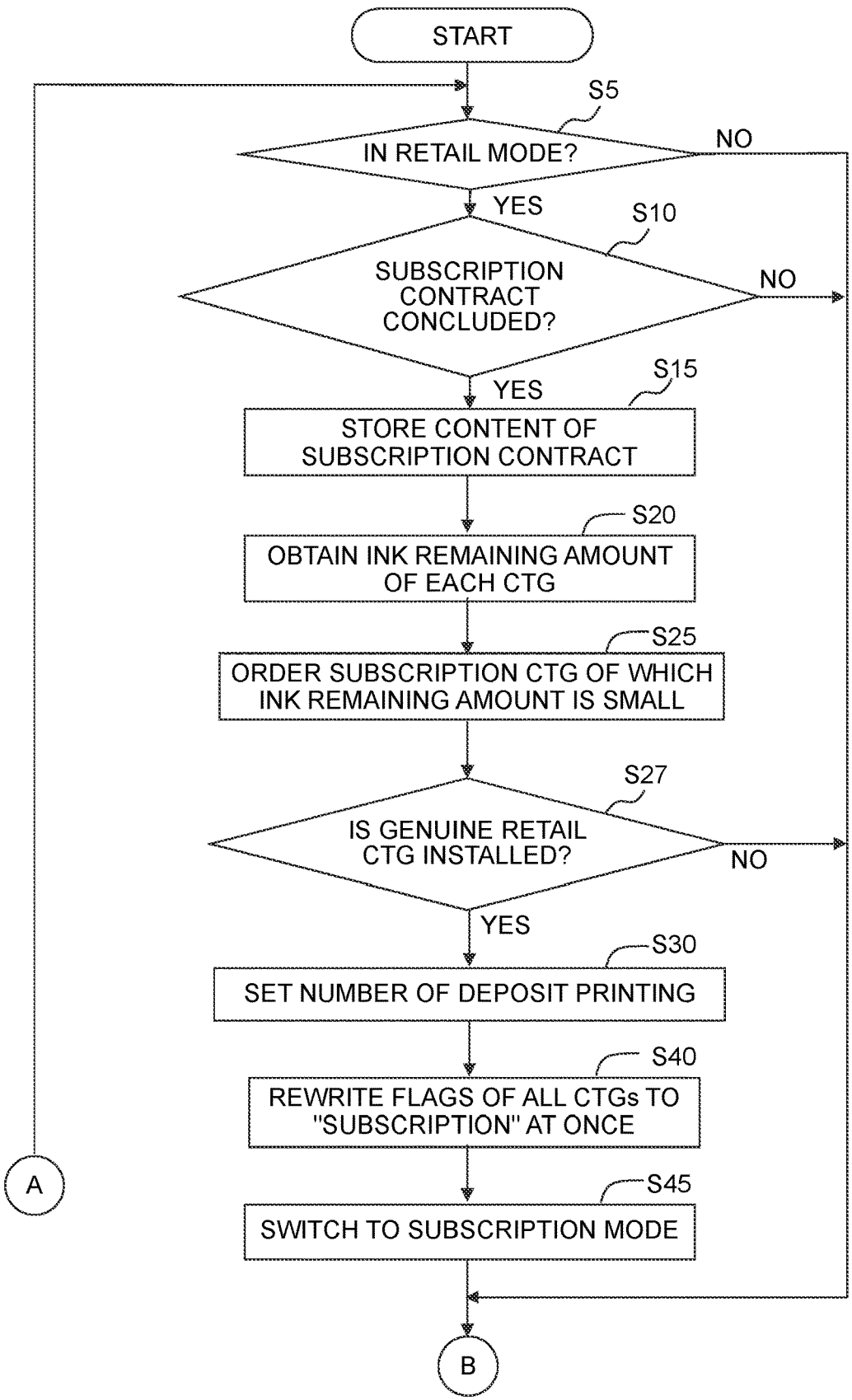
FIGS. 9A and 9B are flow charts depicting a control procedure in a multifunction peripheral.
Figure 9B:
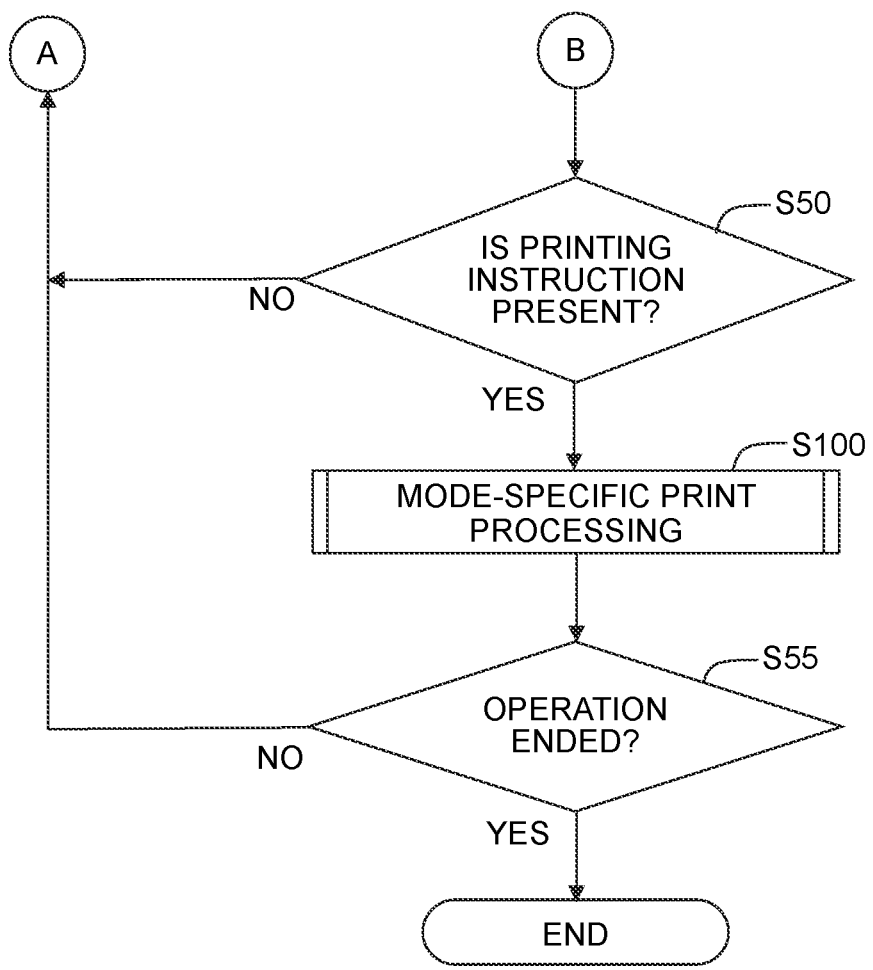

Further, an example of a control procedure applied to the case of the second embodiment is indicated in flow charts of FIGS. 9A and 9B. In FIGS. 9A and 9B, in the determination of step S10, based on a determination of "NO" in a case that the user does not wish to conclude the procedure of the subscription contract, the procedure proceeds to step S50.

Further, in the procedure of step S27 which is executed between step S25 and step S30, instead of step S17 which is omitted in the second embodiment, determination is made only as to whether or not the ink cartridges 50 of all the colors which are being installed at this point of time are each a genuine product, in other words, only as to whether or not the manufacturer information of each of the ink cartridges 50 of all the colors indicates the manufacturer which is same as the manufacturer of the multifunction peripheral 200. In a case that even one of the ink cartridges 50 of all the colors is not the genuine product, a "NO" determination is made, and the procedure proceeds to step S50. On the other hand, in a case that all of the ink cartridges 50 of all the colors are the retail cartridges 50R which are the genuine products of the manufacturer of the multifunction peripheral 200, a "YES" determination is made, and the procedure proceeds to step S30. The other procedures other than above and the mode-specific print processing S100 are same as those in the first embodiment, and any explanation therefor will be omitted.

Also in the multifunction peripheral 200 in the second embodiment, it is possible to achieve the effects similar to those of the first embodiment.

Namely, the multifunction peripheral 200 in the second embodiment is operable by the two operational mode which are the subscription mode and the retail mode. The processer 210 executes the procedure of step S27 and the procedures of steps S40 and S45 for determining as to in which one of the above-described two modes the multifunction peripheral 200 is to be operated.

In the procedure of step S27, obtainment of the information stored in the cartridge memory 55 regarding the ink cartridges 50 being installed in the cartridge holders 51 of the multifunction peripheral 200 is performed via, for example, the communication between the ink cartridges 50 and the communicating part 52. Depending on whether the information stored in the cartridge memory 55 can be obtained and depending on the obtained content in a case that the information stored in the cartridge memory 55 can be obtained, the procedures of steps S40 and S45 are performed. A genuine retail cartridge being installed in step S27 is an example of the predetermined condition.

Via the procedures of steps S40 and S45, at the time of conclusion of the subscription contract, the ink cartridges 50 installed in the cartridge holders 51 are treated as being of the subscription type, and the multifunction peripheral 200 executes the operation in the subscription mode. By the procedures of steps S40 and S45, the ink cartridges 50 installed in the cartridge holders 51 are treated as being of the subscription type, not only in the case that the ink cartridges 50 being installed in the cartridge holders 51 are of the ink cartridges 50S of the subscription type corresponding to the content of the concluded subscription contract, but also in a case that the ink cartridges 50 being installed in the cartridge holders 51 are the ink cartridges 50R of the retail type corresponding to the retail use.

In the second embodiment, even in a case that the ink cartridges 50R of the retail type corresponding to the retail use are being installed in the cartridge holders 51, the ink cartridges 50R of the retail type are treated as being of the subscription type after the conclusion of the subscription contract under a condition that the information stored in the cartridge memory 55 of the ink cartridges 50 satisfies the predetermined condition, and the multifunction peripheral 200 operates in the subscription mode. For example, even in a state that the ink cartridges 50 of the subscription type which are delivered from the delivery base have not arrived at the user yet, it is possible to perform the printing operation with the fixed-sum payment as described above.

According to the second embodiment, it is possible to suppress any disadvantage on the side of the user in a case that the subscription contract is newly concluded in the state that the multifunction peripheral 200 is being used in the retail use.

Further, also in the second embodiment, in the procedure of step S30 executed by the processer 210, the profit return according to the content of the concluded subscription contract is performed based on the changing of the type from the retail type to the subscription type in the procedures of steps S40 and S45. According to the second embodiment, by the execution of the profit return, it is possible to reduce the double monetary burden to the user.

Furthermore, according to the second embodiment, in particular, the multifunction peripheral 200 is communicably connected to the information managing server 100 via the interface 270. According to the second embodiment, even in the case that the ink cartridges 50R of the retail type are being installed in the cartridge holders 51, the ink cartridges 50R of the retail type are treated as being of the subscription type in accordance with the result of communication with the information managing server 100, thereby making it possible to perform the operation in the subscription mode.

Moreover, in the second embodiment, in particular, the information stored in the cartridge memory 55 of each of the ink cartridges 50 is obtained in the procedure of step S27 executed by the processer 210. In the case that the retail type information is included in the information stored in the cartridge memory 55, the retail type information included in the information stored in the cartridge memory 55 is rewritten to the subscription type information, in the procedures of step S40 and S45.

According to the second embodiment, in a case that ink cartridges 50R of the retail type corresponding to the retail use are being installed in the cartridge holders 51, the retail type information is rewritten to the subscription type information, thereby treating the ink cartridges 50 as being of the subscription type and making it possible to operate the multifunction peripheral 200 in the subscription mode.

Third Embodiment

A print processing system 1B according to a third embodiment of the present disclosure will be explained in the following. In the third embodiment, an explanation will be given about a case wherein the user himself or herself purchases a retail cartridge 50R even in a case where the multifunction peripheral 200 operates under the subscription mode, and uses the retail cartridge 50R as the pseudo-subscription cartridge 50S'. Note that an explanation of a configuration and a processing in the respective devices and/or parts (components) of the print processing system 1B of the third embodiment which are same as those in the print processing system 1 of the first embodiment and the print processing system 1A of the second embodiment will be omitted as appropriate.

Figure 10:
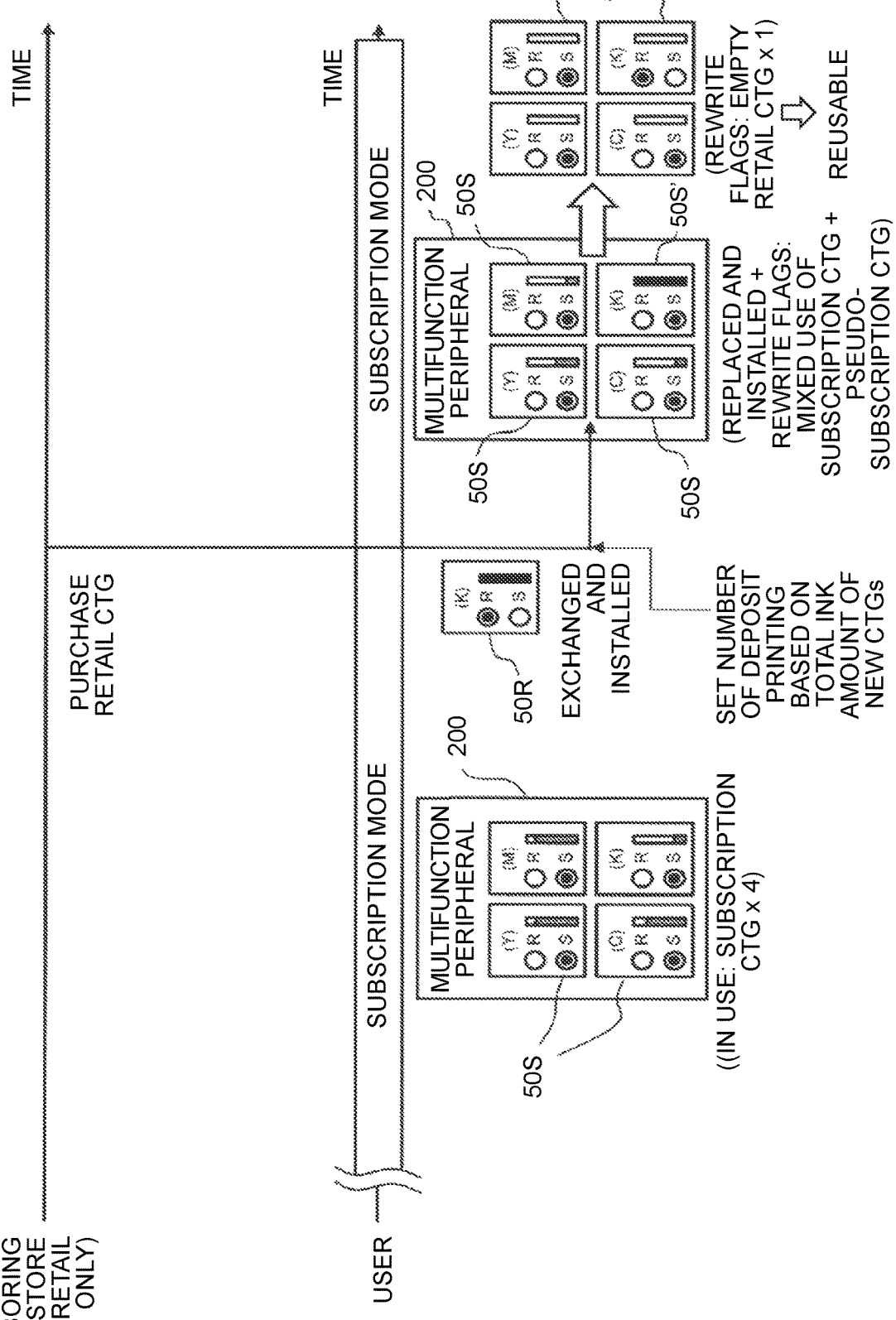
FIG. 10 is a view for explaining a managing method of an ink cartridge.

FIG. 10 is a view for explaining a managing method of an ink cartridge 50 in a case of the third embodiment. In FIG. 10, the third embodiment has such a presumption that the operational mode of the multifunction peripheral 200 is already in the subscription mode due to a fact that, for example, the user has already concluded the subscription contract or the multifunction peripheral 200 itself is a dedicated apparatus for the subscription contract. Even during an operation in such subscription mode, there also might be such a case for example that a subscription cartridge 50S has been consumed earlier than expected and that the user has no choice but to purchase a retail cartridge 50R from a neighboring store so as to perform printing. Further, there might also be such a case that the location of the user is not suitable for an effective delivery and purchasing the retail cartridge 50R from the neighboring store so as to perform the printing is rather suitable.

Even in such a case that a new retail cartridge 50R is installed and used replacing with the consumed subscription cartridge 50S, the type-flag of the retail cartridge 50R is rewritten to the subscription type at the time of replacement and installment so that the retail cartridge 50R is used as a pseudo-subscription cartridge 50S'. Further, it is necessary to perform the profit return while regarding the amount of the ink used from the pseudo-subscription cartridge 50S' as the monetary burden on the side of the user. Accordingly, in an illustrated example of the third embodiment, at the time of replacement and installment of the purchased retail cartridge 50R, the number of deposit printing corresponding to the total ink amount of the new product (newly purchased retail cartridge 50R) is set, and is recorded in the contract content data.

By setting the number of deposit printing corresponding to the total ink amount of the new retail cartridge 50R at the time of exchanging and installment thereof in such a manner, it is possible to set the number of deposit printing in advance on the assumption that the new retail cartridge 50R treated as the pseudo-subscription cartridge 50S' is to be used up.

Figure 11:
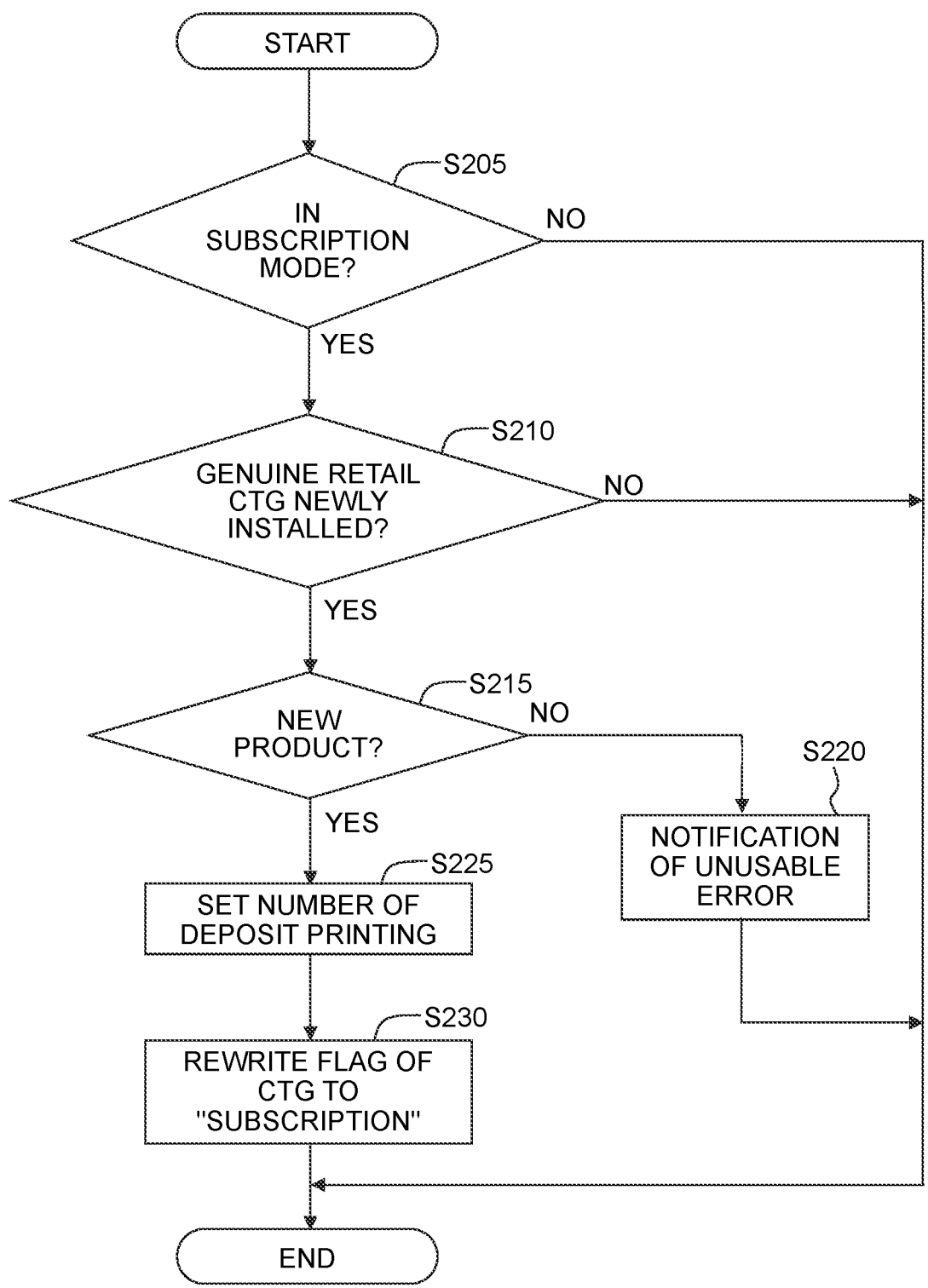
FIG. 11 is a flow chart depicting a control procedure in a multifunction peripheral.

An example of a controlling procedure applied to the case of the third embodiment is indicated in a flowchart of FIG. 11. In FIG. 11, the procedure has such a presumption that the operational mode of the multifunction peripheral 200 is already in the subscription mode due to a fact that, for example, the user has already concluded the subscription contract or that the multifunction peripheral 200 itself is a dedicated apparatus for the subscription contract.

First, in step S205, the operational parameter is referred to so as to determine whether or not the multifunction peripheral 200 is in the subscription mode. In a case that the multifunction peripheral 200 is in the retail mode, a NO determination is made, and this flow is ended. On the other hand, in a case that the multifunction peripheral 200 is in the subscription mode, a YES determination is made, and the procedure proceeds to step S210.

In step S210, determination is made as to whether or not a retail cartridge 50R which is a genuine product is newly installed in the cartridge holder 51. In a case that an ink cartridge 50 which is newly installed in the cartridge holder 51 is a subscription cartridge 50S, or is not a genuine product of the manufacturer of the multifunction peripheral 200, a NO determination is made and the flow is ended. On the other hand, in a case that a retail cartridge 50R which is a genuine product is newly installed in the cartridge holder 51, a YES determination is made, and the procedure proceeds to step S215.

In step S215, determination is made as to whether or not the newly installed retail cartridge 50R is a new product. In case that the newly installed retail cartridge 50R is not a new product and is a used product, a NO determination is made, the procedure proceeds to step S220 so as to notify, in the displaying part 240, etc., an error indicating that this retail cartridge 50R is not usable and then the flow is ended. On the other hand, in a case that the installed retail cartridge 50R is a new product, a YES determination is made and the procedure proceeds to step S225.

In step S225, the number of deposit printing is set based on a full filling amount of the newly installed retail cartridge 50R, and is recorded as the contract content data.

Next, in step S230, the type-flag of the newly installed retail cartridge 50R is rewritten to the subscription flag so as to treat the retail cartridge 50R as a pseudo-subscription cartridge 50S', the operation in the subscription mode is resumed, and the flow is ended.

Note that the procedure of step S210 is an example of the "consumable item information obtaining process" and the "type identifying process", the procedures of step S230 is an example of the "treating process" and the procedures of step S225 is an example of the "profit returning process".

Also in the multifunction peripheral 200 in the third embodiment, it is possible to obtain the effects same as those of the first and second embodiments.

Namely, the multifunction peripheral 200 of the third embodiment executes the procedure of step S210 so as to determine in which one of the above-described two operational modes the multifunction peripheral 200 is to be operated. In the procedure of step S210, the obtainment of the information stored in the cartridge memory 55 regarding the ink cartridge 50 installed in the cartridge holder 51 of the multifunction peripheral 200 is performed via, for example, the communicating part 52. The procedure of step S210 is performed in accordance with the result of obtainment of the information stored in the cartridge memory 55, and whether the ink cartridge 50 installed in the cartridge holder 51 is of the subscription type or the retail type as described above is identified. In a case that at least one ink cartridge 50, of the plurality of ink cartridges 50 installed in the cartridge holders 51, is identified as being of the retail cartridge during the operation in the subscription mode, the profit return is performed in the procedure of step S225.

In the third embodiment, in a case that the multifunction peripheral 200 is operated in the subscription mode, the state that the retail cartridge 50R is being installed is identified based on the information stored in the cartridge memory 55 obtained and the profit return is performed. Thus, it is possible to suppress any disadvantage to the user which might occur in spite of the state that the subscription contract is concluded.

<Other Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Note that in a case that the retail cartridge 50R is used as the pseudo-subscription cartridge 50S' as described above, there might be such a case that a subscription cartridge 50S which is originally to be used is installed replacing with the pseud-subscription cartridge 50S', with the ink being left in the pseudo-subscription cartridge 50S' without being completely used up, during the usage thereof. In this case, the number of deposit printing which is set as the profit return to the user should be set corresponding to an ink amount of the ink which has been substantially used in the pseudo-subscription cartridge 50S'. Accordingly, the number of deposit printing may be set based on substantial ink consuming amount calculated as the difference between the total ink amount of new retail cartridge 50R and the ink remaining amount of the pseudo-subscription cartridge 50S' at the timing of replacing the pseudo-subscription cartridge with the subscription cartridge 50S, not based only on the total ink amount of the new retail cartridge 50R at the timing of installing the new retail cartridge 50R replacing with the used cartridge 50 as described above.

Figure 12A:
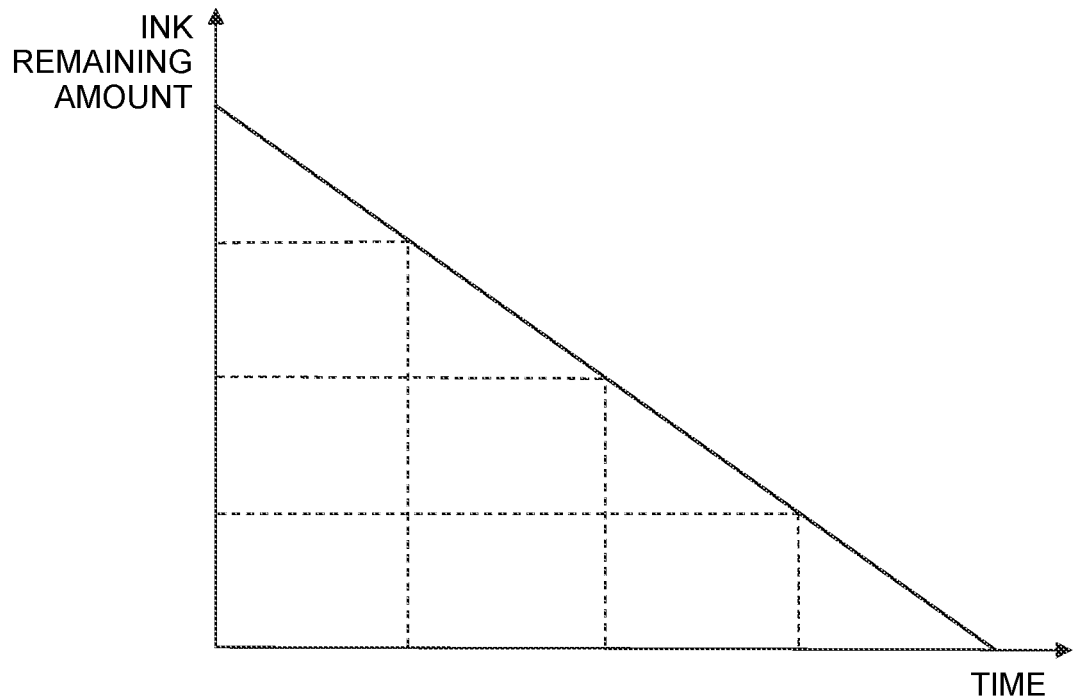
FIGS. 12A and 12B are views for explaining impartment of the number of deposit printing in a divided manner.
Figure 12B:
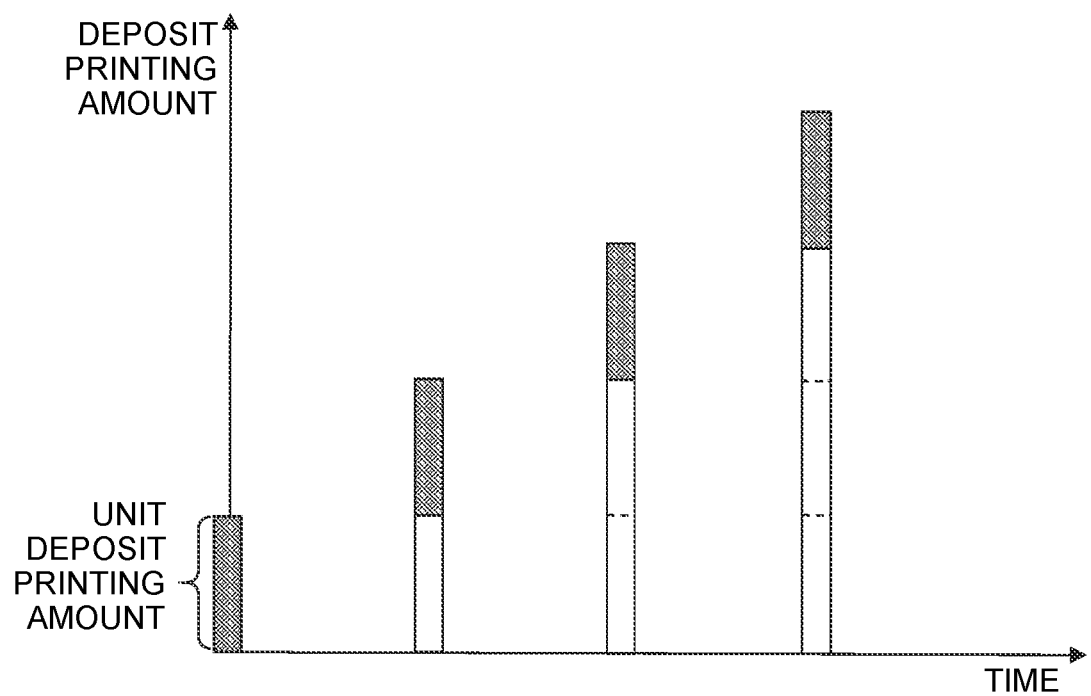

Further, as depicted in FIGS. 12A and 12B, the number of deposit printing may be set such that a unit deposit printing amount of a predetermined amount is initially imparted at a timing of replacement and installment of a retail cartridge 50R, and a deposit printing amount by a multiple of the unit deposit printing amount is added, in accordance with the decrease in the ink remaining amount. Note that the number of deposit printing in this case is permitted in a manner that the number of printing is divided into a plurality of partial permitted amount. The procedure of step S30 is an example of "permitting each of the plurality of partial permitted amounts sequentially and gradually, depending on a change of the ink remaining amount".

In such a manner, in the procedure of step S30, the number of deposit printing exceeding the upper limit value is not permitted at once; rather, the plurality of permitted parts is sequentially permitted in the stepped manner. With this, for example, even in a case that the ink cartridge 50 is removed halfway before being fully used by the user after the profit return to the user has been performed, it is possible to suppress any loss on the side of the manufacturer to the minimum.

Furthermore, the printing service contract may be, other than the above-described subscription contract, a contract of printing service for a measured rate charging such as charging by the number of printing, etc., or may be a fixed-rate printing service without any upper limit value of the amount of printing within a predetermined period of time. Moreover, the above embodiments are applicable to a case in which a type of printing service contract is switched from one to another. In this case, from viewpoint of one type of the printing service contract, another type of the printing service contact is treated as not being concluded.

Further, the flow charts depicted, respectively, in FIGS. 6A, 6B, 7A, 7B, 9A, 9B, and 11, etc., are not intended to limit or restrict the present disclosure to the procedures indicated in these flow charts, and any addition and/or deletion of the procedures or change in the orders, etc., may be made.

Furthermore, other than those described above, the methods in the respective embodiments and the respective modifications may be used in combination.

What is claimed is:

1. A printing apparatus comprising:
  an installing part in which a consumable item to be used in printing is to be installed;
  a printer configured to print an image on a printing medium by using the consumable item installed in the installing part; and
  a controller, wherein:
  the printing apparatus is configured to operate in a contract mode based on content of a contract regarding the consumable item to be used in the printing; and
  the controller is configured to execute a profit returning process of performing profit return according to the content of the contract in a case that the consumable item installed in the installing part has a type corresponding to a non-contract mode not based on the content of the contract and that the printing apparatus is operated in the contract mode.

2. The printing apparatus according to claim 1, wherein:
  the printing apparatus is further configured to operate in the non-contract mode; and
  the controller is further configured to:
    execute a consumable item information obtaining process of obtaining consumable item information of the consumable item installed in the installing part;
    a type identifying process of identifying whether the consumable item installed in the installing part has a first type corresponding to the contract mode or a second type corresponding to the non-contract mode based on the consumable item information obtained in the consumable item information obtaining process; and
    in a case that the consumable item newly installed in the installing part, during a period in which the printing apparatus is operated in the contract mode, is identified as having the second type in the type identifying process, perform the profit return in the profit returning process.

3. The printing apparatus according to claim 2, wherein:
  the consumable item information is configured to be stored in a consumable item memory provided in the consumable item, and includes a first type information indicating that the consumable item has the first type or a second type information indicating that the consumable item has the second type; and
  the controller is configured to:
    obtain the consumable item information stored in the consumable item memory, in the consumable item information obtaining process; and
    in a case that the consumable item information stored in the consumable item memory of the consumable item installed in the installing part includes the second type information, treat the consumable item installed in the installing part as the consumable item of the first type by rewriting the second type information stored in the consumable item memory to the first type information.

4. The printing apparatus according to claim 1, wherein:
  the printing apparatus is further configured to operate in the non-contract mode;
  the installing part is configured such that a plurality of pieces of the consumable item is to be installed in the installing part;
  the controller is further configured to:
    execute a consumable item information obtaining process of obtaining consumable item information of the consumable item installed in the installing part;
    execute a type identifying process of identifying whether the consumable item installed in the installing part has a first type corresponding to the contract mode or a second type corresponding to the non-contract mode, based on the consumable item information obtained in the consumable item information obtaining process; and
    in a case that at least one of the plurality of pieces of the consumable item is identified as having the second type in the type identifying process and the consumable item information of the at least one of the plurality of pieces of the consumable item identified as having the second type fulfills a predetermined condition, execute a treating process of treating the at least one of the plurality of pieces of the consumable item identified as having the second type as the consumable item of the first type, at a timing at which the printing apparatus starts to be operated in the contract mode; and
    in a case that the at least one of the plurality of pieces of the consumable item identified as having the second type is treated as the consumable item of the first type in the treating process, perform the profit return, in the profit returning process, according to the content of the contract.

5. The printing apparatus according to claim 4, wherein the timing at which the printing apparatus starts to be operated in the contract mode is a timing at which the consumable item of the first type delivered to the printing apparatus, after concluding of the contract, is installed in the installing part.

6. The printing apparatus according to claim 4, wherein:
  the consumable item information is configured to be stored in a consumable item memory provided in the consumable item, and includes first type information indicating that the consumable item has the first type or second type information indicating that the consumable item has the second type; and the controller is configured to:
obtain the consumable item information stored in the consumable item memory in the consumable item information obtaining process;
identify the first type information or the second type information included in the consumable item information, in the type identifying process; and
in a case that the second type information is identified in the consumable item information stored in the consumable item memory of the consumable item installed in the installing part, treat the consumable item installed in the installing part as the consumable item of the first type by rewriting the second type information stored in the consumable item memory of the consumable item installed in the installing part to the first type information, in the treating process.

7. The printing apparatus according to claim 6, wherein, in a case that the second type information is identified with respect to at least one of the plurality of pieces of the consumable item installed in the installing part in the type identifying process, the controller is configured to treat each of the plurality of pieces of the consumable items installed in the installing part as the consumable item of the first type by rewriting the second type information of each of the plurality of pieces of the consumable items installed in the installing part to the first type information, in the treating process.

8. The printing apparatus according to claim 1, wherein:
the printing apparatus is further configured to operate in the non-contract mode;
the controller is further configured to:
execute a consumable item information obtaining process of obtaining consumable item information of the consumable item installed in the installing part;
in a case that the consumable item information obtained in the consumable item obtaining process fulfills a predetermined condition, execute a treating process of treating the consumable item which has a second type corresponding to the non-contract mode and which is installed in the installing part as the consumable item of a first type corresponding to the contract mode, and operate the printing apparatus in the contract mode, at a timing at which the contract is concluded; and
in a case that the consumable item of the second type is treated as the consumable item of the first type in the treating process, perform the profit return according to the content of the contract in the profit returning process.

9. The printing apparatus according to claim 8, further comprising a communication interface configured to communicate with a server via a network,
wherein, in the treating process, the controller is configured to treat the consumable item installed in the installing part as the consumable item of the first type depending on a result of the communication between the printing apparatus and the server via the communication interface, and operate the printing apparatus in the contract mode.

10. The printing apparatus according to claim 8, wherein:
the consumable item information is configured to be stored in a consumable item memory provided in the consumable item, and includes a first type information indicating that the consumable item has the first type or a second type information indicating that the consumable item has the second type; and the controller is configured to:
obtain the consumable item information stored in the consumable item memory in the consumable item information obtaining process; and
in a case that the second type information is included in the consumable item information stored in the consumable item memory of the consumable item installed in the installing part, treat the consumable item installed in the installing part as the consumable item of the first type by rewriting the second type information stored in the consumable item memory of the consumable item installed in the installing part to the first type information, in the treating process.

11. The printing apparatus according to claim 1, wherein the controller is configured to, in the profit returning process, perform the profit return depending on a consumption state amount indicating a remaining amount or a consumption amount of a printing agent in the consumable item.

12. The printing apparatus according to claim 11, further comprising a memory,
wherein the controller is further configured to:
execute a treating process of treating the consumable item of a second type corresponding to the non-contract mode as the consumable item of a first type corresponding to the contract mode;
in a case that the consumable item of the second type is treated as the consumable item of the first type in the treating process, perform the profit return in the profit returning process;
in a case that the profit return is performed, execute a storing process of storing identifying information of the consumable item based on which the profit return has been performed, in the memory, as processed identifying information;
in a case that the consumable item is newly treated as the consumable item of the first type in the treating process, execute a determining process of determining whether the identifying information of the consumable item newly treated as the consumable item of the first type matches the processed identifying information stored in the memory or not; and
in a case that the identifying information of the consumable item newly treated as the consumable item of the first type matches the processed identifying information stored in the memory, not perform the profit return based on the consumable item newly treated as the consumable item of the first type.

13. The printing apparatus according to claim 11, further comprising a communication interface configured to communicate with a server via a network,
wherein the controller is further configured to:
execute a treating process of treating the consumable item of a second type corresponding to the non-contract mode as the consumable item of a first type corresponding to the contract mode;
in a case that the consumable item of the second type is treated as the consumable item of the first type in the treating process, perform the profit return in the profit returning process;
in a case that the profit return is performed, execute a storing process of storing identifying information of the consumable item based on which the profit return has been performed, in a memory of the server, as processed identifying information;
in a case that the consumable item is newly treated as the consumable item of the first type in the treating process, execute a determining process of determining whether the identifying information of the consumable item newly treated as the consumable item of the first type matches the processed identifying information stored in the memory or not by inquiring about the identifying information of the consumable item newly treated as the consumable item of the first type to the server; and in a case that the identifying information of the consumable item newly treated as the consumable item of the first type matches the processed identifying information stored in the memory in the determining process, not perform the profit return based on the consumable item newly treated as the consumable item of the first type.

14. The printing apparatus according to claim 13, wherein the controller is configured to execute the profit returning process, in a case that the consumable item newly treated as the consumable item of the first type is determined to be a recycled consumable item based on the inquiring to the server, even in a case that the identifying information of the consumable item newly treated as the consumable item of the first type is determined to match the processed identifying information stored in the memory in the determining process.

15. The printing apparatus according to claim 11, wherein:
the contract defines an upper limit value of an amount of the printing by the printer in a predetermined period in exchange for payment of a predetermined price; and
in the profit returning process, the controller is configured to permit, as the profit return, the printing by the printer exceeding the upper limit value as much as a predetermined permitted amount without requiring additional payment, in a case that the amount of the printing performed by the printer in the predetermined period reaches the upper limit value.

16. The printing apparatus according to claim 15, wherein:
the predetermined permitted amount includes a plurality of partial permitted amounts, and
the controller is configured to permit each of the plurality of partial permitted amounts sequentially and gradually, depending on a change of the consumption state amount.

17. The printing apparatus according to claim 15, further comprising a communication interface configured to communicate with a server via a network,
wherein the controller is further configured to:
execute a profit return information obtaining process of obtaining profit return information indicating content of the profit return from the server, the profit return information being associated with contract identifying information assigned to the contract at the server in a case that the contract is concluded; and
permit the printing exceeding the upper limit value depending on the consumption state amount of the consumable item based on which the profit return is performed and the profit return information obtained in the profit return information obtaining process, in the profit returning process.

18. The printing apparatus according to claim 15,
wherein the controller is configured to permit the printing exceeding the upper limit value depending on the consumption state amount of the consumable item based on which the profit return is performed.

19. A printing apparatus with a consumable item comprising:
a consumable item to be used in printing;
an installing part in which the consumable item is installed or to be installed;
a printer configured to print an image on a printing medium by using the consumable item installed in the installing part; and
a controller, wherein:
the printing apparatus with a consumable item is configured to operate in a contract mode based on content of a contract regarding the consumable item to be used in the printing;
the consumable item has a first type corresponding to the contract mode or a second type corresponding to a non-contract mode not based on the content of the contract; and
the controller is configured to execute a profit returning process of performing profit return according to the content of the contract in a case that the consumable item installed in the installing part has the second type and that the printing apparatus is operated in the contract mode.

* * * * *